(12) United States Patent
Zelman

(10) Patent No.: US 7,097,299 B2
(45) Date of Patent: *Aug. 29, 2006

(54) REMOVABLE LENS MOUNTED TO AN EYEWEAR PLATFORM

(76) Inventor: Gary M. Zelman, 997 Flower Glen Rd., Simi Valley, CA (US) 93065

( * ) Notice: Subject to any disclaimer, the term of this patent is extended or adjusted under 35 U.S.C. 154(b) by 0 days.

This patent is subject to a terminal disclaimer.

(21) Appl. No.: 10/927,455

(22) Filed: Aug. 26, 2004

(65) Prior Publication Data

US 2005/0243270 A1    Nov. 3, 2005

Related U.S. Application Data

(63) Continuation of application No. 10/112,970, filed on Mar. 27, 2002, now Pat. No. 6,786,593, which is a continuation-in-part of application No. 10/055,466, filed on Jan. 22, 2002, now abandoned, which is a continuation-in-part of application No. 10/035,296, filed on Nov. 8, 2001, now Pat. No. 6,585,370, and a continuation-in-part of application No. 09/483,552, filed on Jan. 14, 2000, now Pat. No. 6,343,858, which is a continuation-in-part of application No. 09/184,694, filed on Nov. 2, 1998, now Pat. No. 6,550,913.

(51) Int. Cl.
*G02C 5/00* (2006.01)
(52) U.S. Cl. .......................... 351/41; 351/47
(58) Field of Classification Search ................. 351/41, 351/47, 48, 57, 58, 103–109, 44
See application file for complete search history.

(56) References Cited

U.S. PATENT DOCUMENTS 5,026,150 A * 6/1991 Weber ................... 351/47
6,585,370 B1 * 7/2003 Zelman ................. 351/103

OTHER PUBLICATIONS

Manhattan Design Studio, "Takumi Magnetic Eyewear" sales catalog (pp. 43-75), (app.) Oct. 1997, New York, New York.

* cited by examiner

*Primary Examiner*—Huy Mai
(74) *Attorney, Agent, or Firm*—Trojan Law Office

(57) ABSTRACT

Eyeglasses having a lens frame removably attached to an eyewear platform using different attachment devices such as magnets, clips, snap connections or other attachment devices that provide effective resistance from said lens frame from becoming involuntarily detached from said eyewear platform. This eyewear allows the user to quickly and easily change lenses or sunglasses.

6 Claims, 24 Drawing Sheets

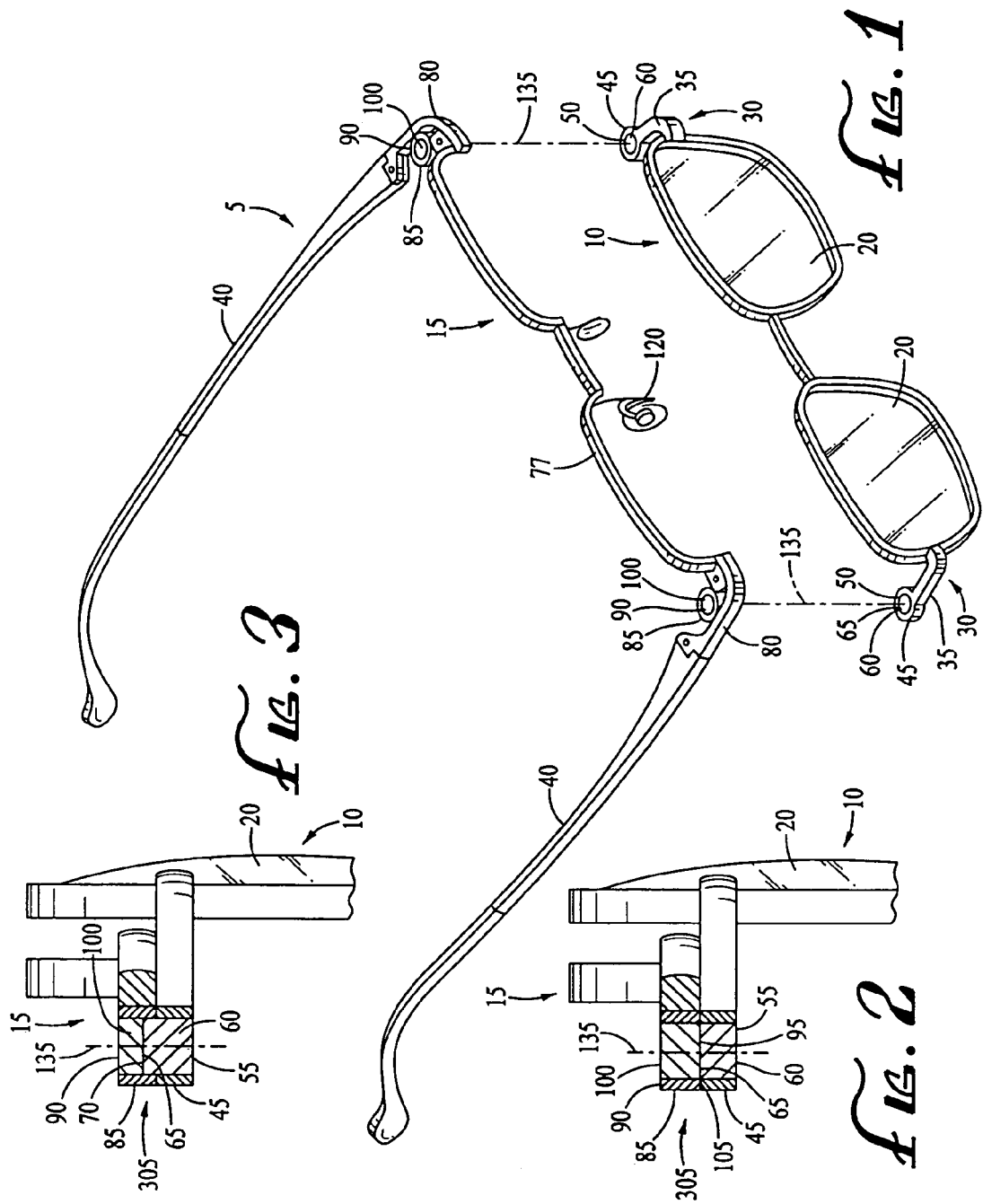

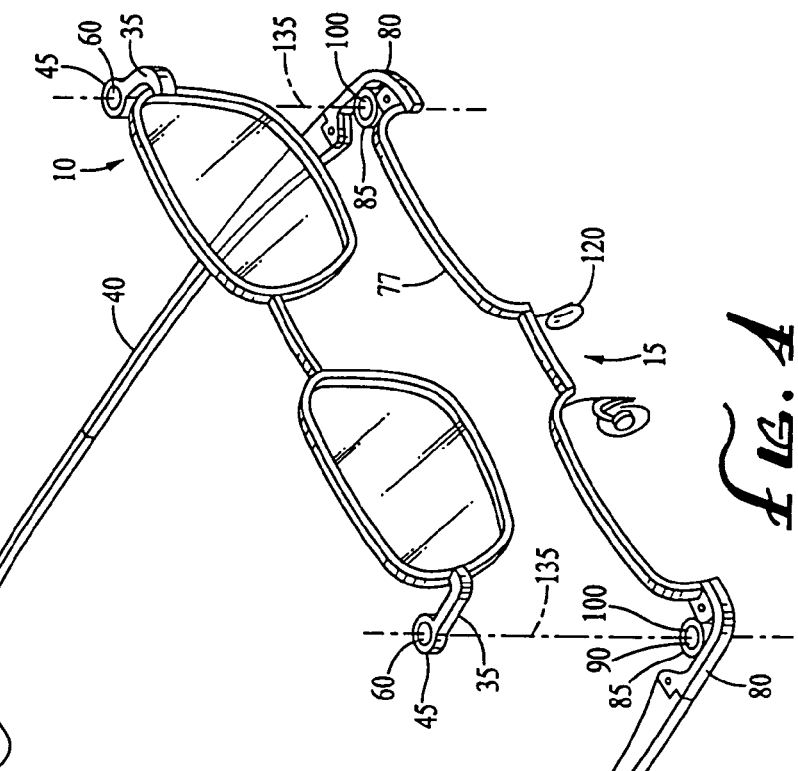
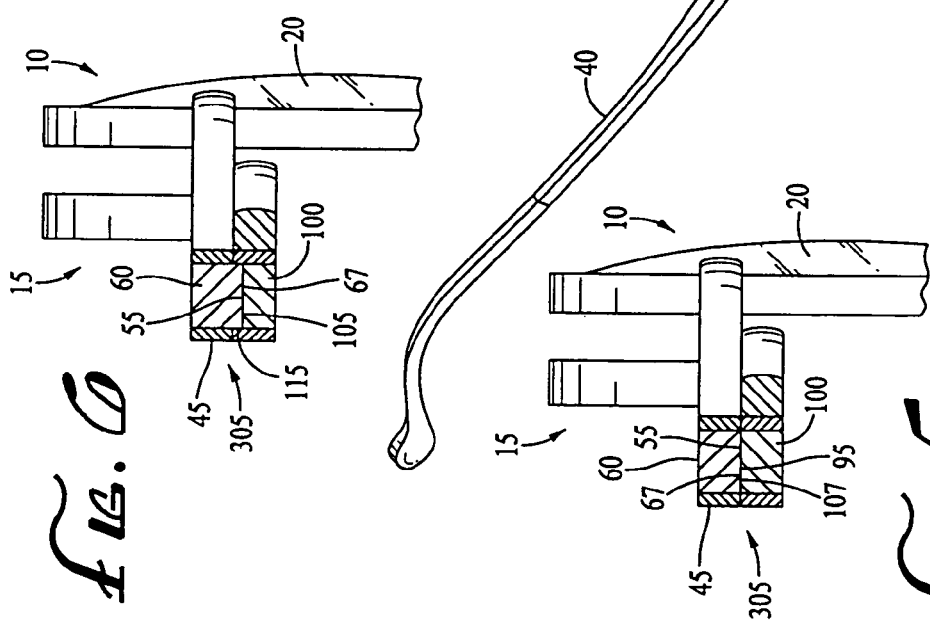

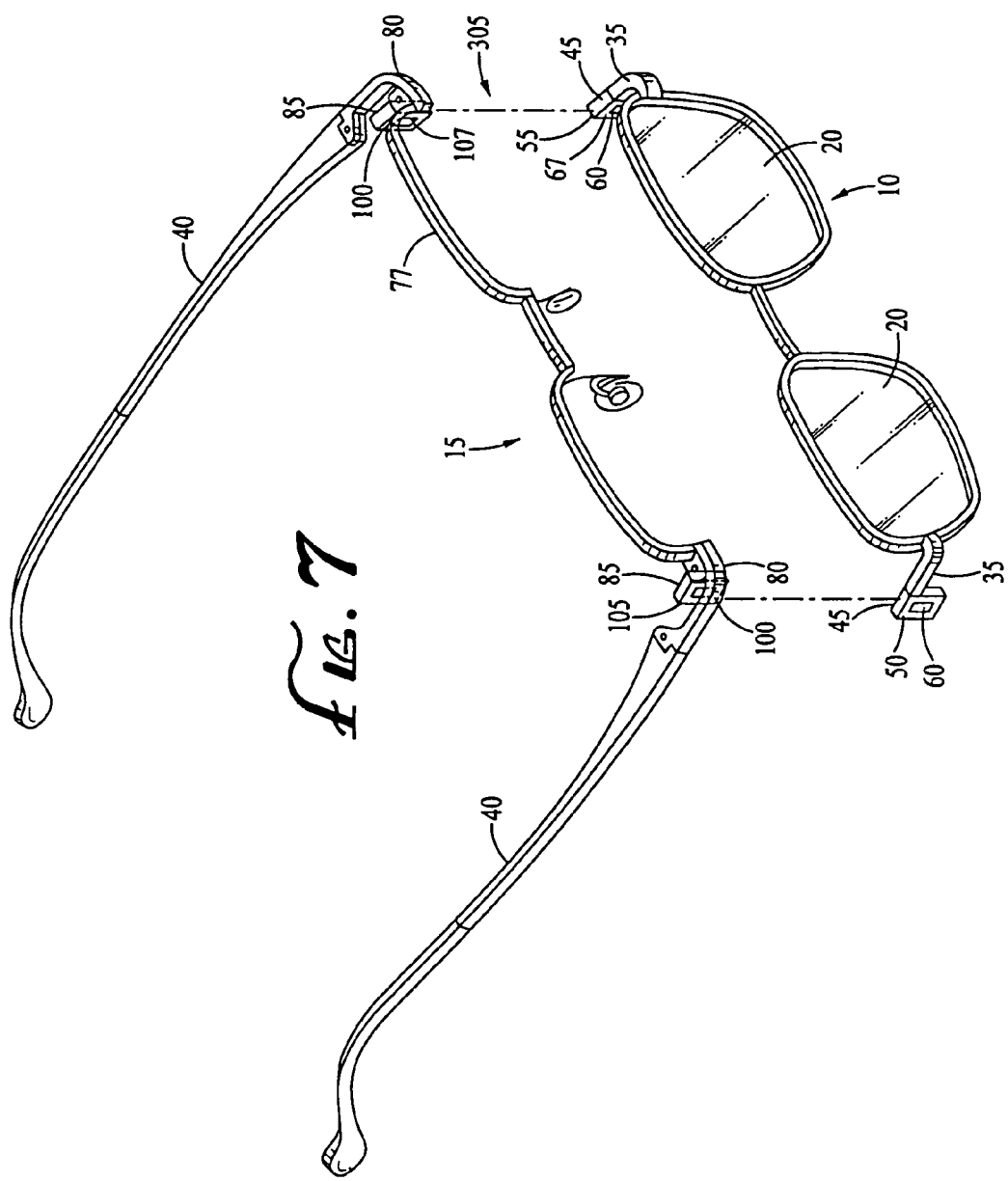

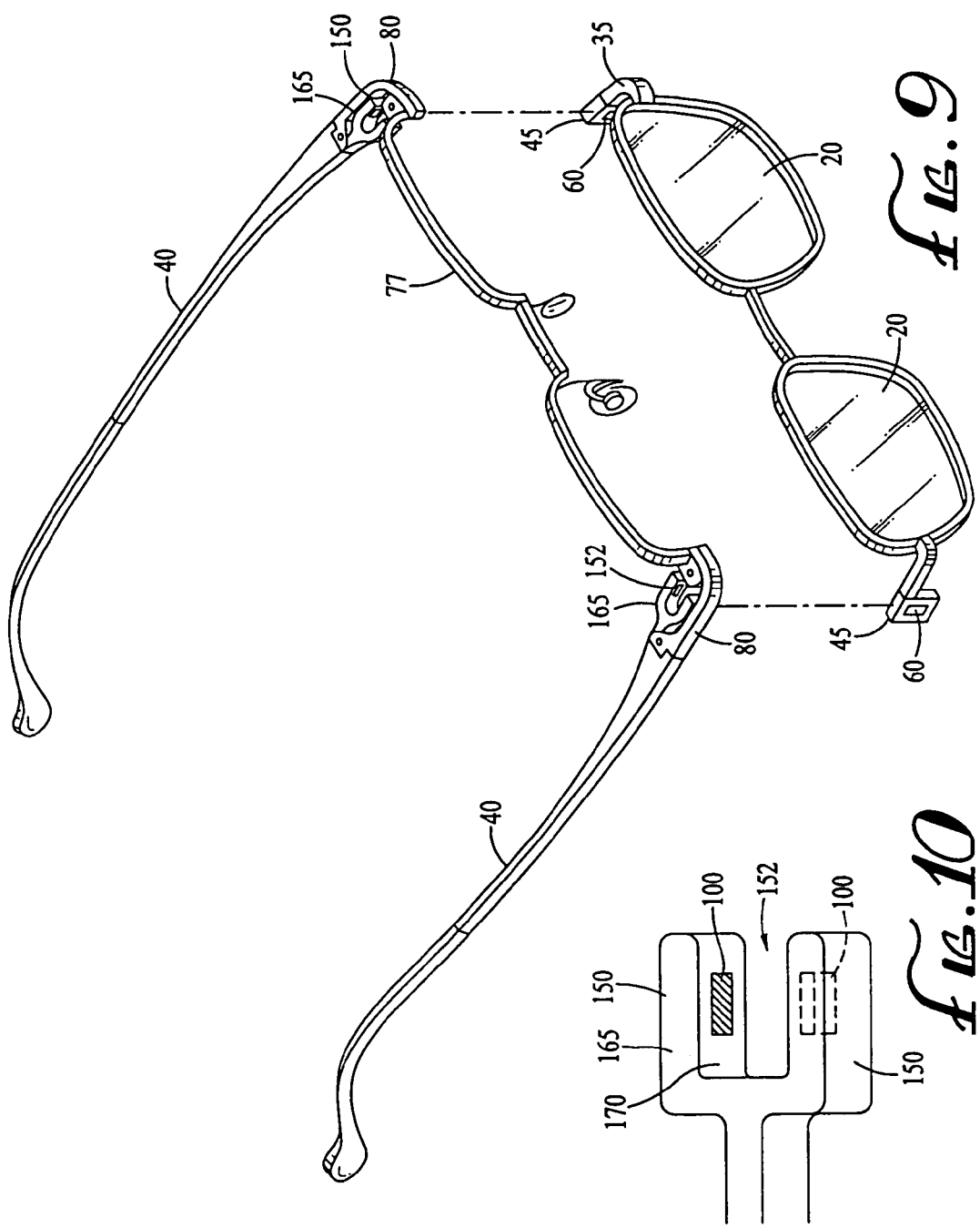

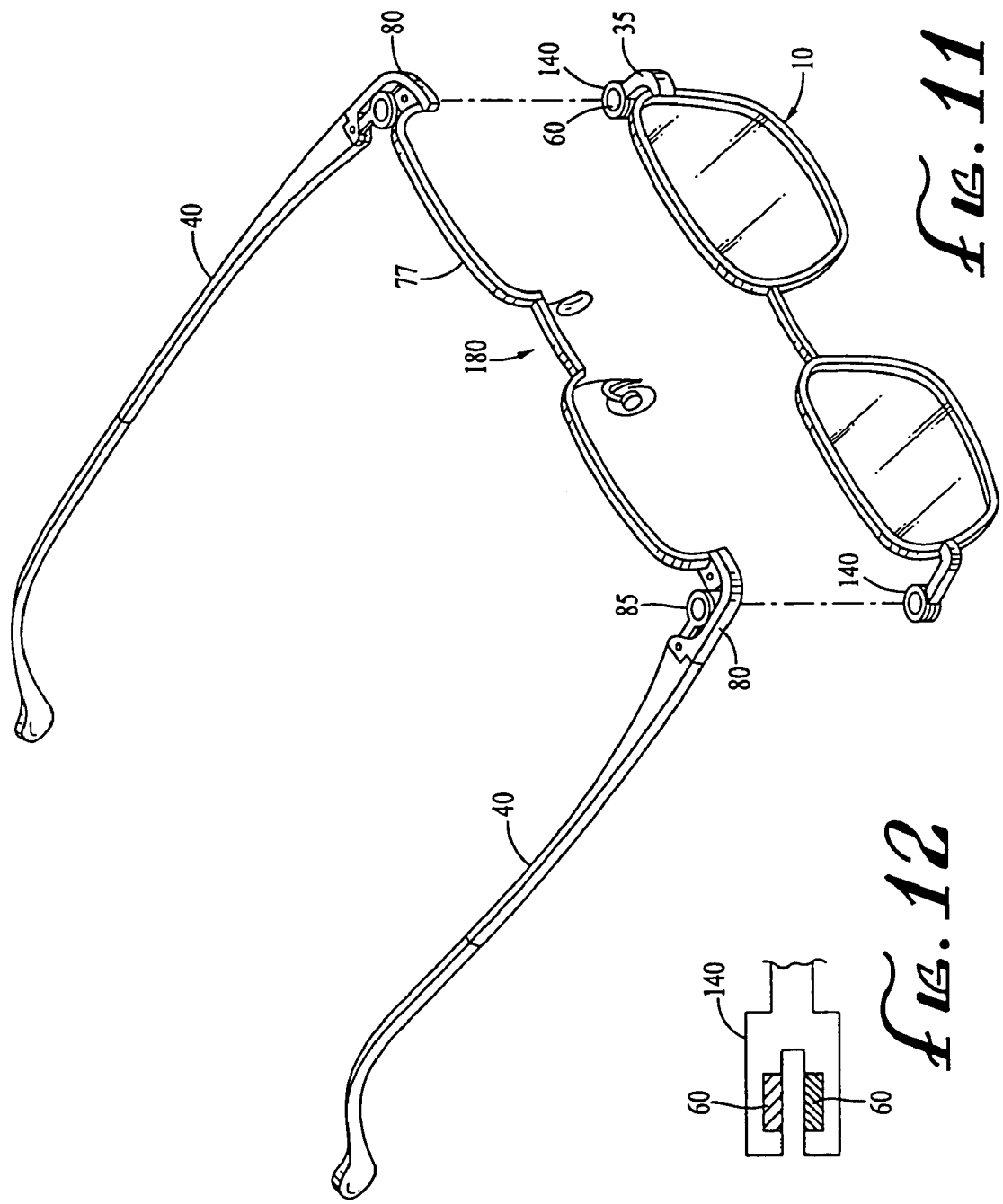

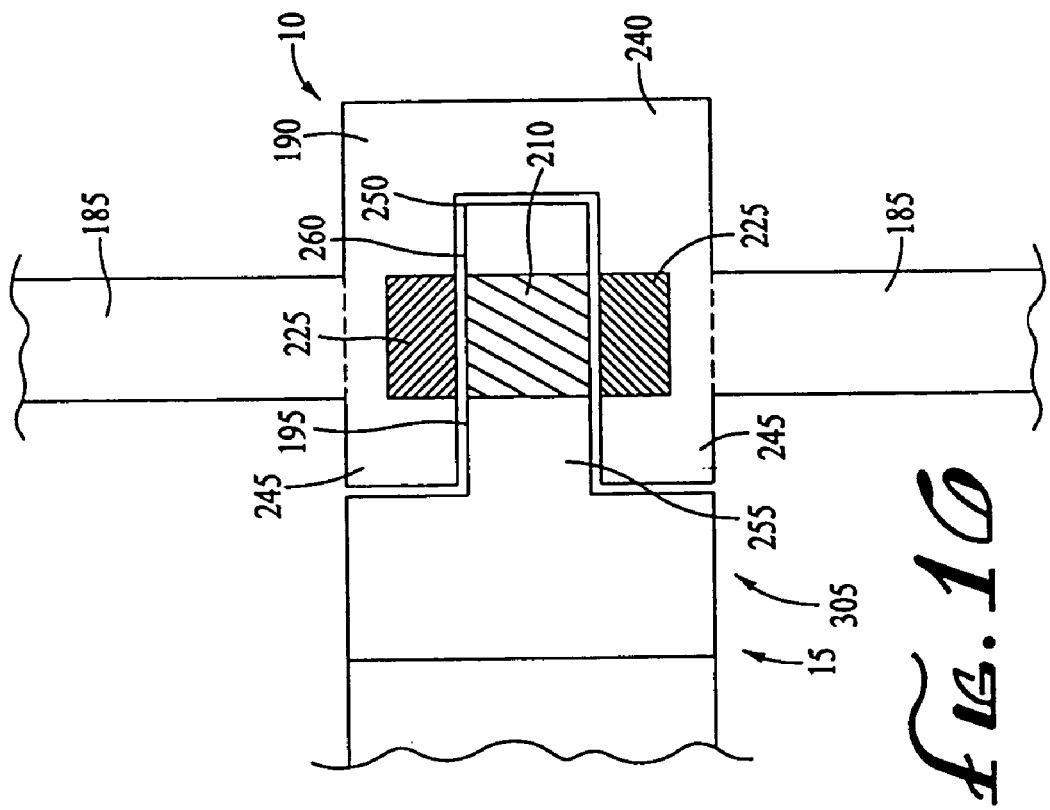
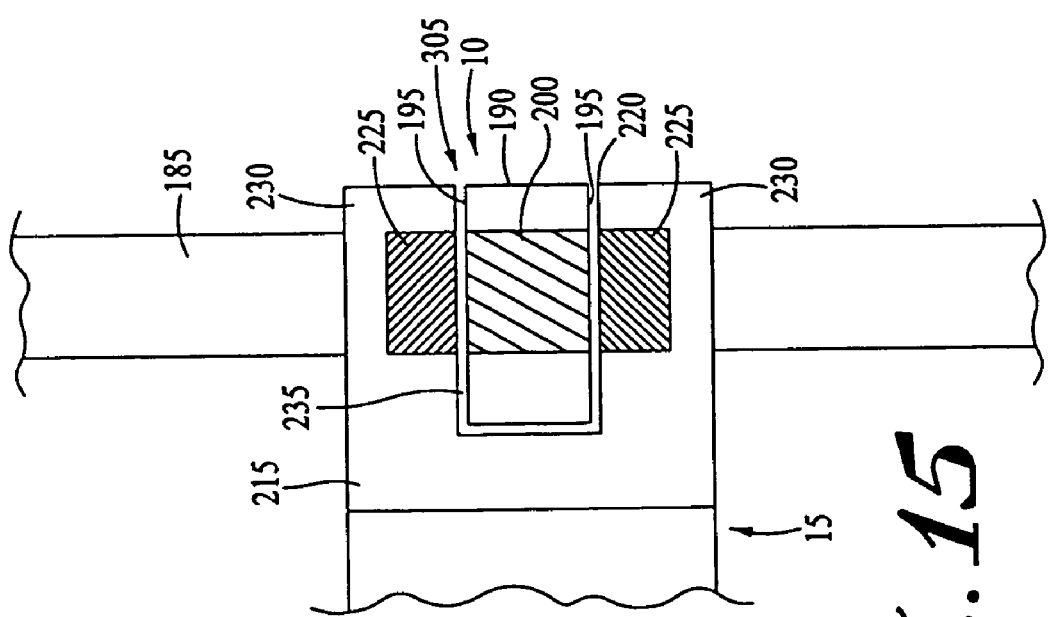

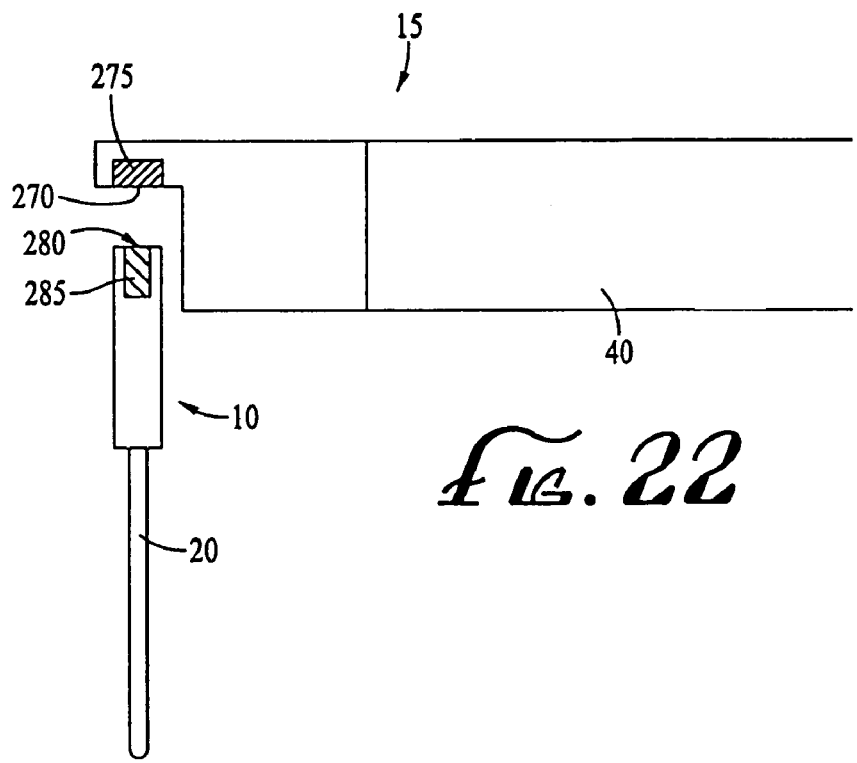
*fig. 22*
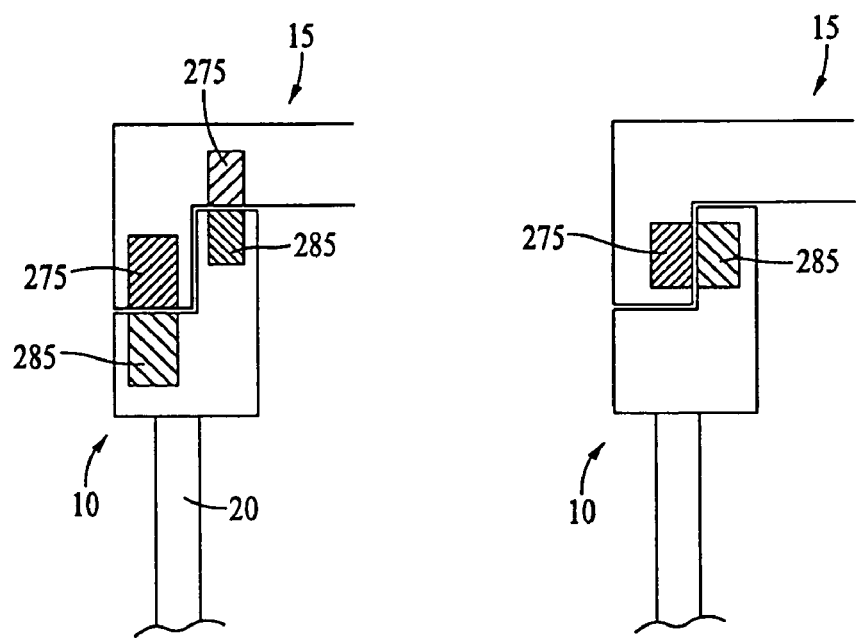
*fig. 23*  *fig. 24*

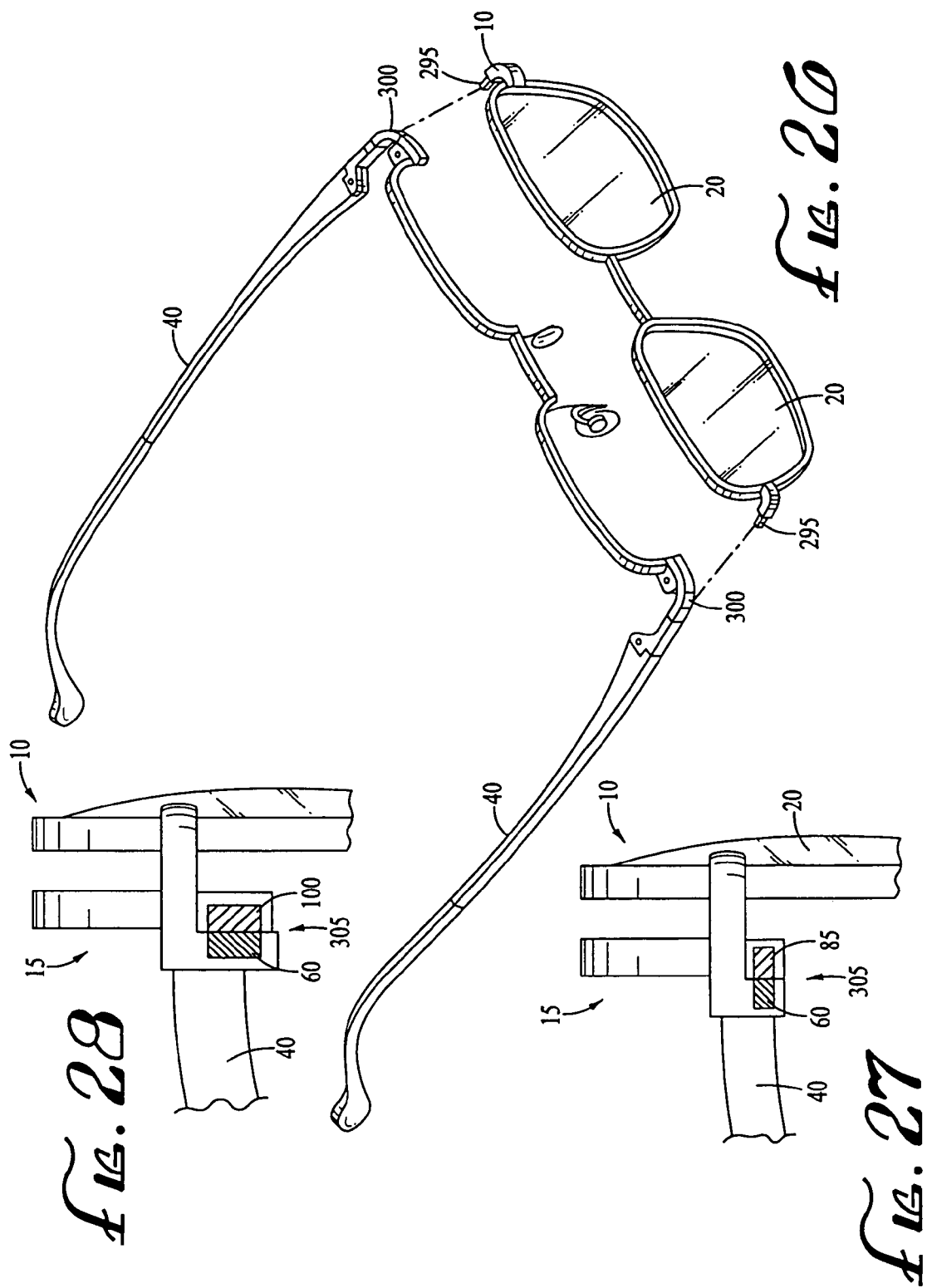

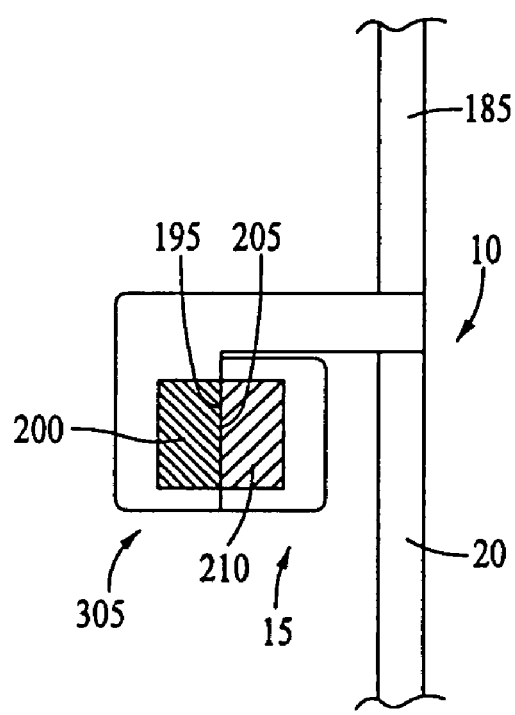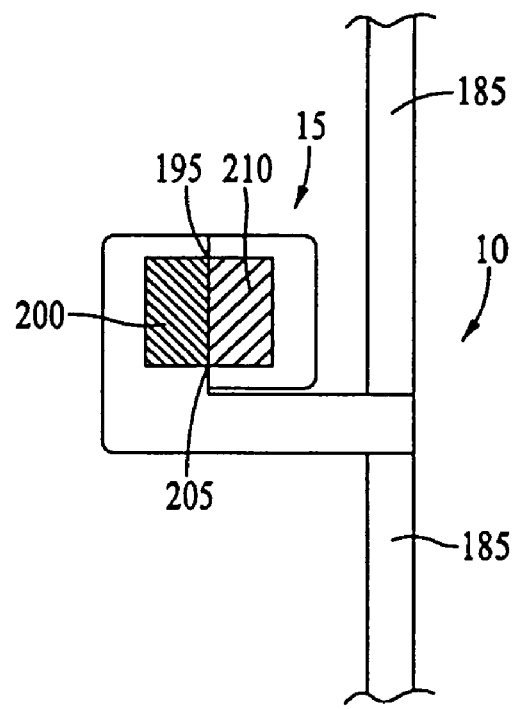

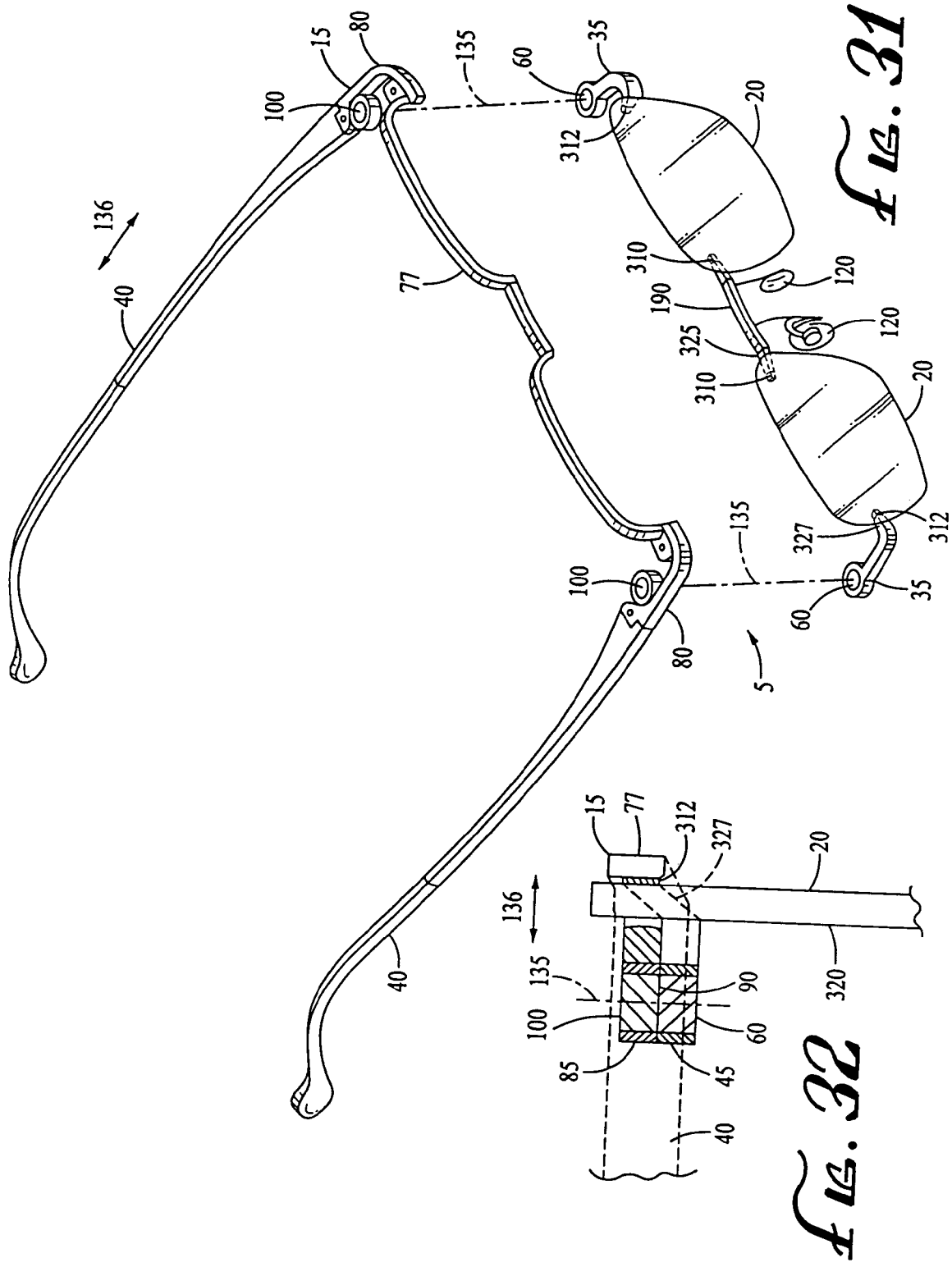

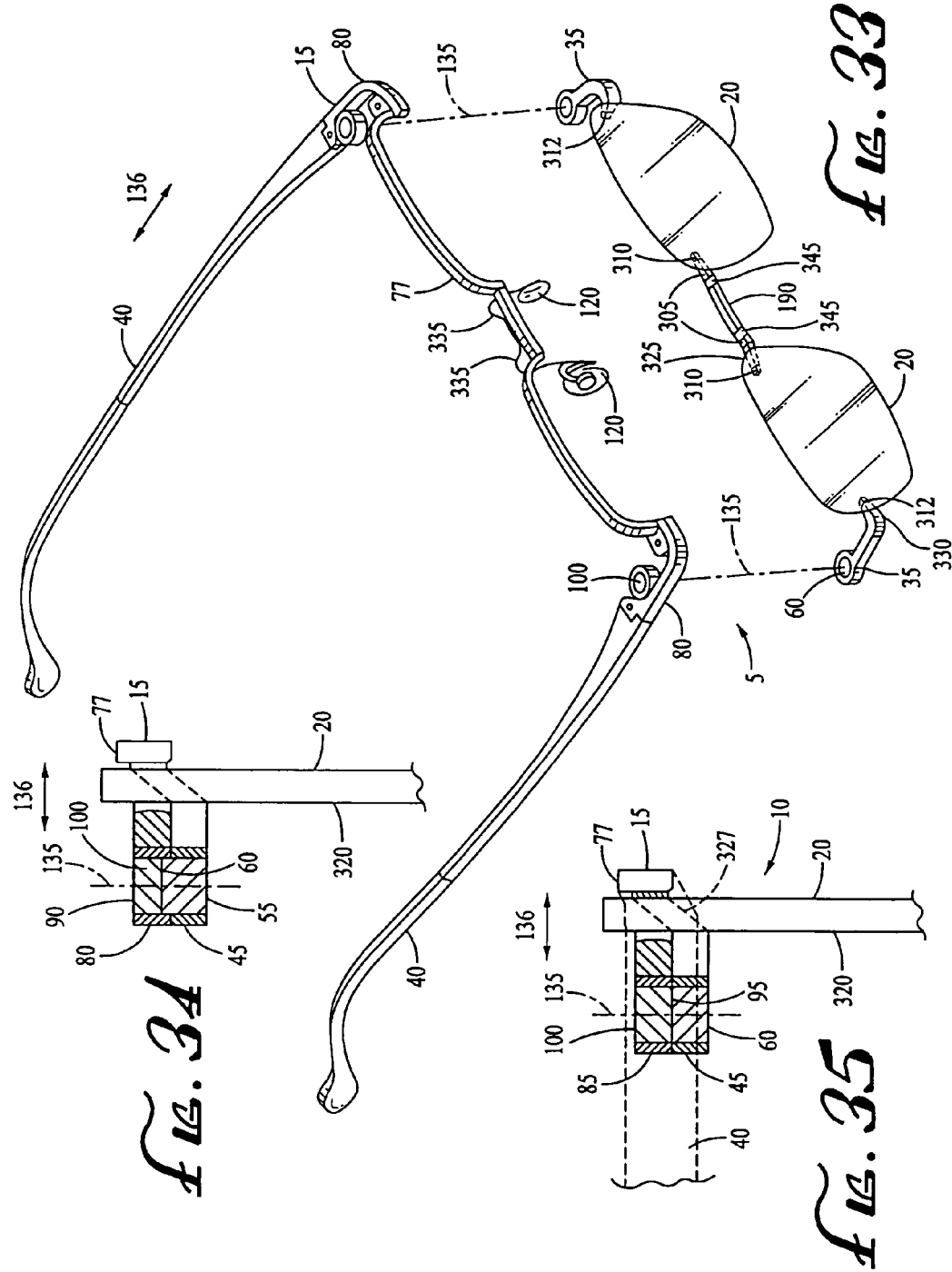

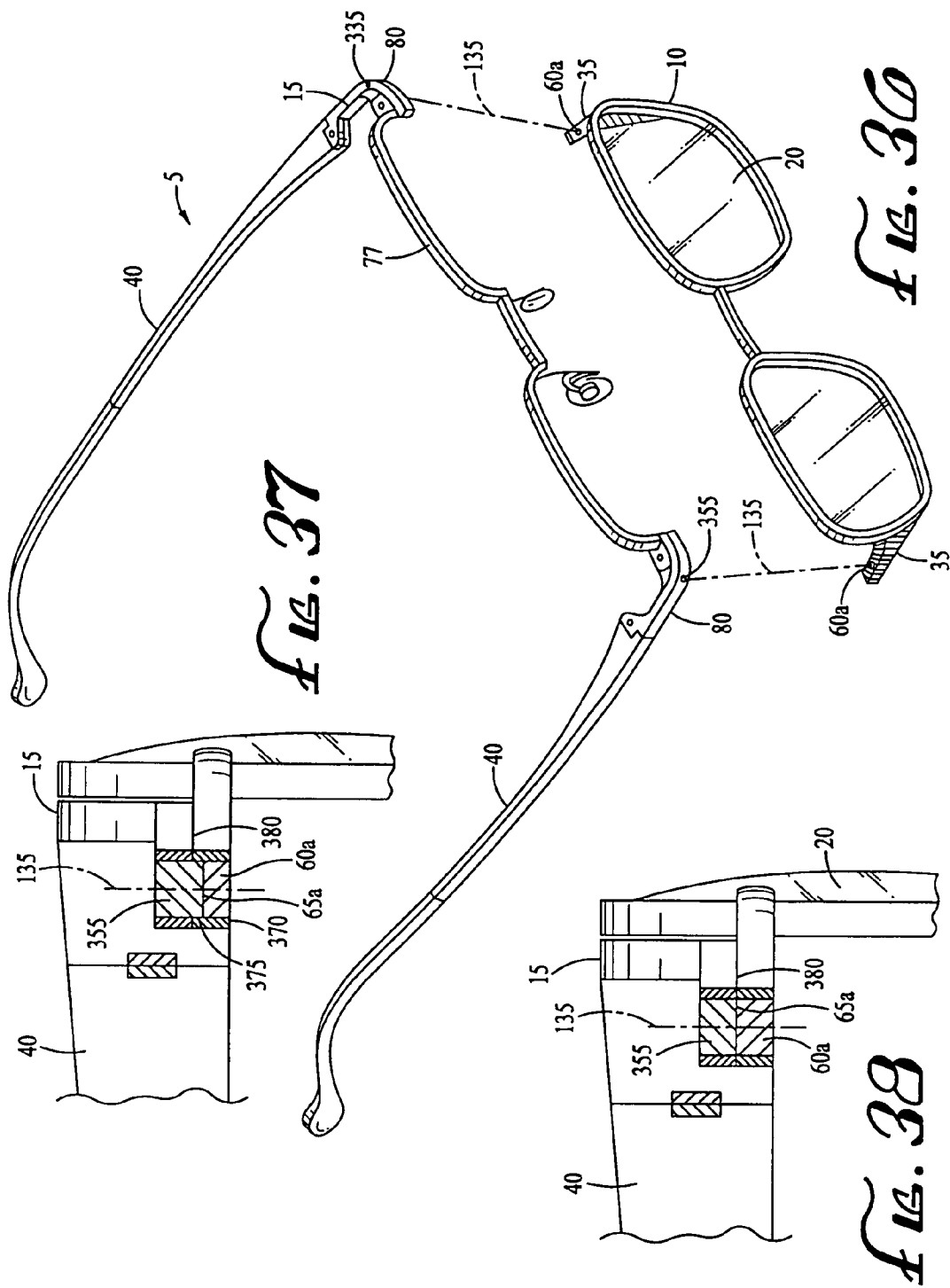

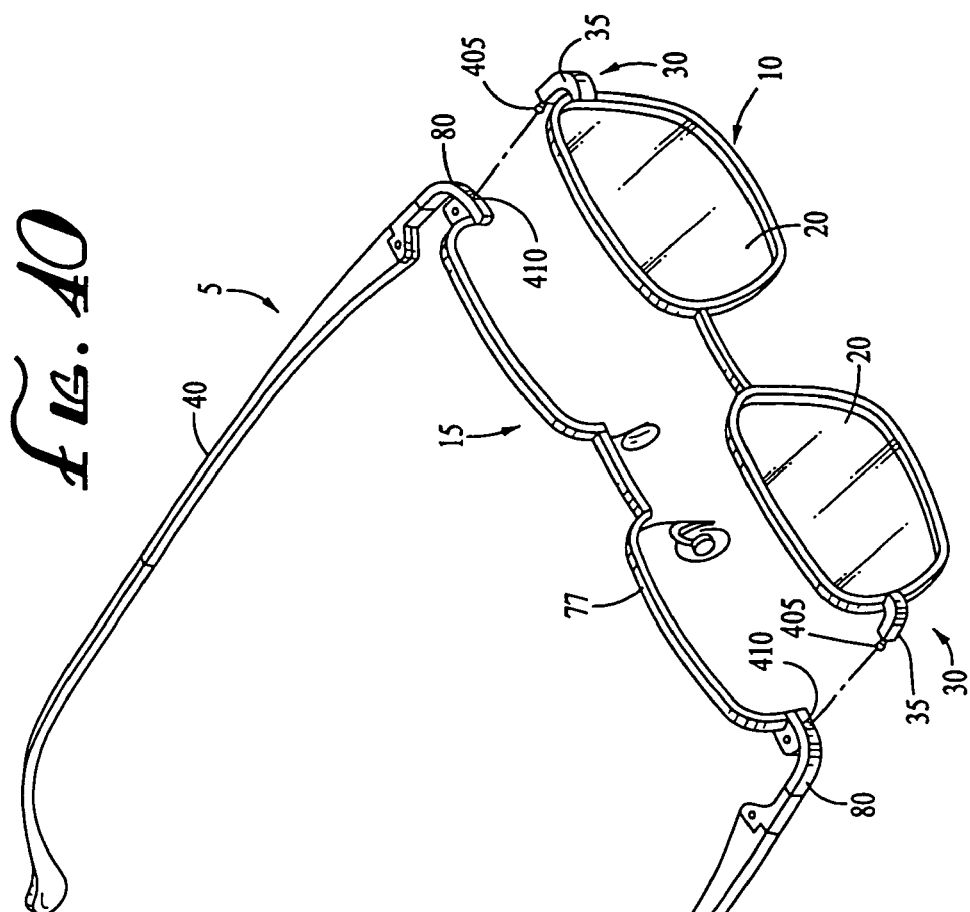
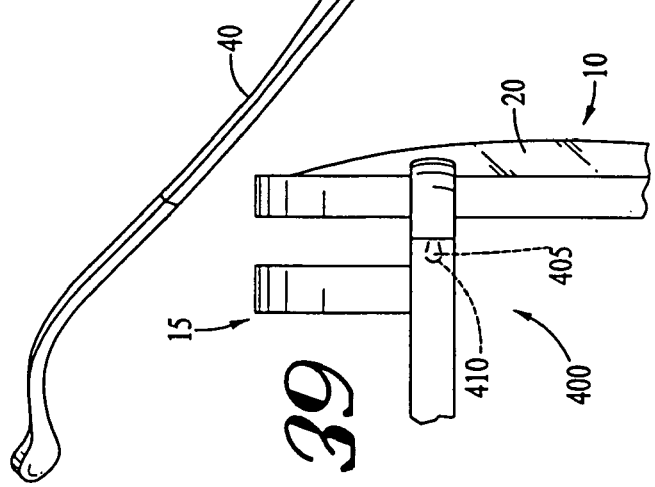

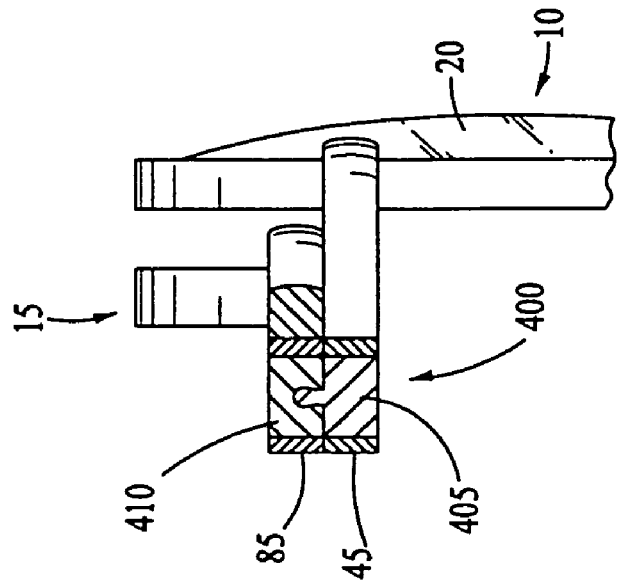
Fig. A1
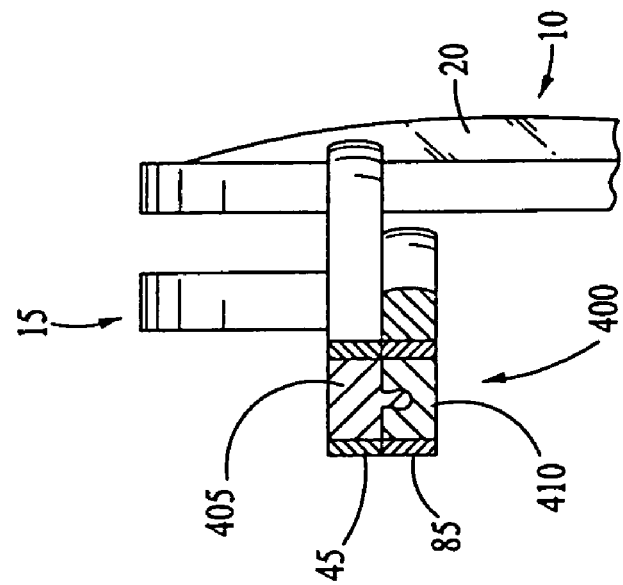
Fig. A2

REMOVABLE LENS MOUNTED TO AN EYEWEAR PLATFORM

PRIORITY CLAIM

This is a continuation application of U.S. Ser. No. 10/112,970, filed on Mar. 27, 2002, now U.S. Pat. No. 6,786,593 which is a continuation-in-part application of U.S. Ser. No. 10/055,466, filed Jan. 22, 2002, now abandoned which is a continuation-in-part application of U.S. Ser. No. 10/035,296, which was filed on Nov. 8, 2001 now U.S. Pat. No. 6,585,370. This application is also a continuation-in-part application of U.S. patent application Ser. No. 09/184,694, filed on Nov. 2, 1998 now U.S. Pat. No. 6,550,913 and U.S. patent application Ser. No. 09/483,552, filed Jan. 14, 2000, now U.S. Pat. No. 6,343,858, which is a continuation-in-part of U.S. patent application Ser. No. 09/184,694, filed on Nov. 2, 1998 now U.S. Pat. No. 6,550,913.

BACKGROUND OF THE INVENTION

1. Field of the Invention

This invention relates to eyewear and eyeglasses and a method of using said eyewear and eyeglasses, which provide a lens frame removably attached to an eyewear platform with magnets or other attachment devices. By allowing removable attachment of the lens frame to an eyewear platform, the user will be able to maximize his or her ability to change lenses depending on the need and/or situation.

2. Background Information

Prior to the present invention, auxiliary eyewear attachments, which connect to primary or conventional eyeglasses with magnets or clips, allow the user to convert a pair of conventional eyeglasses to sunglasses and to avoid the need for an additional pair of prescription sunglasses. This auxiliary eyewear can also be used to change the prescription of the lenses on the primary eyewear. Many current designs attach auxiliary eyewear using magnets or clips at various locations on a pair of conventional or primary eyeglasses.

However, there are several disadvantages to mounting an auxiliary set of lenses to conventional eyeglasses, which already have their own set of lenses. First, there is the additional and extra weight of the auxiliary lenses. Even with the advent of plastic lenses, the additional weight of another frame and another set of lenses may distract and cause some irritation to the user.

Second, since there are two sets of lenses, having two sets of lenses so close to one another can cause a glare or reflection. This reflection or glare can be quite annoying and can partly defeat the use of sunglasses to reduce glare and to improve the sight of the user.

Third, the space or separation between the two lenses may cause some distraction to the field of vision of the user. Many current styles of sunglasses have smaller or narrow lenses. Because the field of vision through these lenses is smaller than through larger lenses, when auxiliary lenses are attached to the primary or conventional eyewear, the user may see the difference between the two sets of lenses. This difference can be quite distracting to the user.

Fourth, people, who do not require prescription glasses, would not practically use these current auxiliary eyewear attachments without glasses. They would not be able to take advantage of the ability to switch the color of their sunglasses.

The claimed invention avoids the above problems and provides significant advantages with a new apparatus and method for attaching a removable lens frame to an eyewear platform. In the applicant's invention, the lenses themselves are removable from the eyewear platform so that the user can easily change lenses and only needs to wear only one set of lenses at a time. By only using one set of lenses in this eyewear, there is reduced weight, no glare or reflection between lenses, and no distraction in the field of vision with the applicant's invention. In addition, since there is only one set of lenses, it is easier for the user to keep these lenses clean. Further, by using the same eyewear platform as a base to attach different lenses, the user is able to employ one eyewear apparatus that allows for a multiple and different types of lenses and that can be changed easily and quickly. This instant eyewear apparatus is also comfortable to wear and easy to use. Keeping a small case with different types of lenses is easier to transport than several boxes of different eyewear. Finally, instead of having several different pairs of conventional glasses, the user may have substantial savings in cost by having different sets of lenses for one eyewear platform.

This invention allows the user to maximize the different kinds of eyewear available according to his or her need. For example, the user can easily change from reading lenses for fine print to sunglasses. Also, people, who do not need prescription lenses, can change the color of their sunglasses depending on their particular need or situation. For example, the user may require yellow lenses for driving in the mountains, but gray lenses for fishing or boating on a bright sunny day.

Also, this invention allows for effective and easy replacement of safety glasses and eyewear. By allowing for removable attachment of a lens frame with safety lenses, it is possible for the user to easily wear and to change safety lenses after these lenses become dirty, scratched, or broken. Because only the lens frame is being replaced, the user will save money in simply replacing this lens frame instead of the entire safety eyewear.

In addition, this eyewear apparatus also provides the ability to change lenses quickly but also provides a stable and effective attachment to provide effective resistance to the lens frame from becoming involuntarily detached from the eyewear platform.

From the preceding descriptions, it is apparent that the devices currently being used have significant disadvantages or limitations. Thus, important aspects of the technology used in the field of invention remain amenable to useful refinement.

SUMMARY OF THE INVENTION

The purpose of the present invention is to provide eyewear and a method that provides a lens frame removably attached to an eyewear platform with magnets, clips, snaps, clasps, hooks or other attachment devices that effectively prevent the removable lens frame from becoming involuntarily detached from the eyeglass platform. In the preferred embodiment of the invention, the removable lens frame is attached to the eyewear platform by at least one magnet.

In other embodiments of the invention, the removable lens frame can be connected to the eyewear platform with non-magnetic attachments. Also, the lens frame can be removably connected to the eyewear platform with a combination of magnetic and non-magnetic attachments.

In another embodiment of the invention, magnets on the face of the lens removably connect to the back of the eyewear platform such that the lenses sit behind the bridge portion of the eyewear platform.

The present invention introduces such refinement. In its preferred embodiments, the present invention has several aspects or facets that can be used independently, although they are preferably employed together to optimize their benefits. All of the foregoing operational principles and advantages of the present invention will be more fully appreciated upon consideration of the following detailed description, with reference to the appended drawings.

BRIEF DESCRIPTION OF THE DRAWINGS

FIG. 1 shows an exploded view of the first embodiment of the applicant's removable lens frame and eyewear platform, where the lens frame is mounted below the eyewear platform.

FIG. 2 shows a side view of the embodiment of FIG. 1.

FIG. 3 shows a side view of another embodiment of the invention where the appendage socket magnet fits partially within a depression of the temple socket.

FIG. 4 shows an exploded view of another embodiment of the applicant's removable lens frame and eyewear platform, where the lens frame is mounted above the eyewear platform.

FIG. 5 shows a side view of the embodiment of FIG. 3.

FIG. 6 shows a side view of another embodiment of the invention where the second contact surface of the appendage socket magnet contacts the first contact surface of the temple socket magnet within a depression of the temple socket.

FIG. 7 shows an exploded view of another embodiment of the invention where the temple socket and appendage sockets are aligned vertically.

FIG. 9 shows an exploded view of another embodiment of the invention where the temple socket, which is in the shape of a prong, is aligned to contact the vertically aligned appendage socket.

FIG. 10 shows a close-up view of the platform arm prong of FIG. 9.

FIG. 11 shows an exploded view of horizontally mounted appendage prong on the lens frame to be mounted to a temple socket on the eyewear platform.

FIG. 12 shows a side view of the horizontally mounted appendage prong of FIG. 11.

FIG. 15 shows a side view of a U-shaped attachment on the eyewear platform to connect to a central portion on the lens frame.

FIG. 16 shows a side view of a U-shaped attachment on the lens frame to connect to a central portion on the eyewear platform.

FIG. 22 shows a side view of another embodiment of the invention where the eyewear bridge is removably attached over the top of the lens frame with magnets.

FIG. 23 shows a side view of another embodiment of the invention where the lens frame is removably attached to the underside of the eyewear platform using a plurality of magnets.

FIG. 24 shows a side view of another embodiment of the invention where the lens frame is removably attached to the underside of the eyewear platform using a plurality of magnets.

FIG. 26 shows an exploded view of another embodiment where the lens frame is removably attached to the eyewear platform with a plug and channel connection device.

FIG. 27 is a side view of another embodiment of the invention where the lens frame is removably attached to the eyewear platform using magnets.

FIG. 28 is a side view of another embodiment of the invention where the lens frame is removably attached to the eyewear platform using magnets.

FIG. 29 is a side view of another embodiment where the lens frame reaches over the eyewear bridge to removably attach to the eyewear platform using magnets.

FIG. 30 is a side view of another embodiment where the lens frame reaches under the eyewear bridge to removably attach to the eyewear platform using magnets.

FIG. 31 shows another embodiment of the invention where the lens frame is fitted behind the bridge of the eyewear platform.

FIG. 32 shows a side view of the embodiment shown in FIG. 31.

FIG. 33 shows another embodiment of the invention where the lenses sit behind the eyewear platform and within a space formed from the nose pads and the lens connector.

FIG. 34 is a side view of the embodiment of FIG. 33.

FIG. 35 is a side view of another embodiment of FIG. 33 with the temple socket magnet rising above the surface of the temple socket.

FIG. 36 shows another embodiment of the invention where the magnets are located directly in the platform arms and the appendages.

FIG. 37 is a side view of the embodiment of FIG. 36.

FIG. 38 is a side view of another embodiment of the FIG. 36.

FIG. 39 is a side and partial cross-sectional view of the lens frame removably attached to the eyewear platform with a snap connection.

FIG. 40 is an exploded view of the embodiment of FIG. 39.

FIG. 41 is a side and partial cross-sectional view of the lens frame removably attached to and over the eyewear platform with a snap connection.

FIG. 42 is a side and partial cross-sectional view of the lens frame removably attached to and under the eyewear platform with a snap connection.

DETAILED DESCRIPTION OF THE INVENTION

Referring to FIGS. 1–3, there are illustrated eyeglasses 5 with a lens frame 10 removably attached and connected to an eyewear platform 15.

Lens Frame

Figure 17:
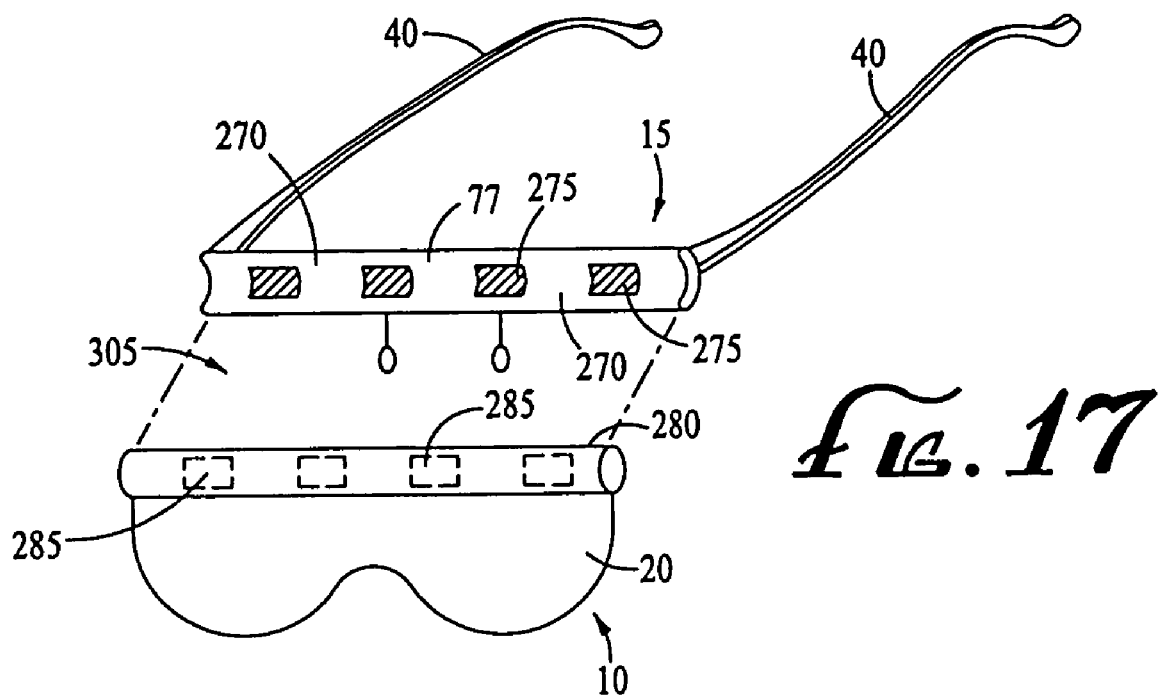
FIG. 17 shows an exploded view of another embodiment of the invention where the lens frame is removably attached to the eyewear platform using magnets.
Figure 19:
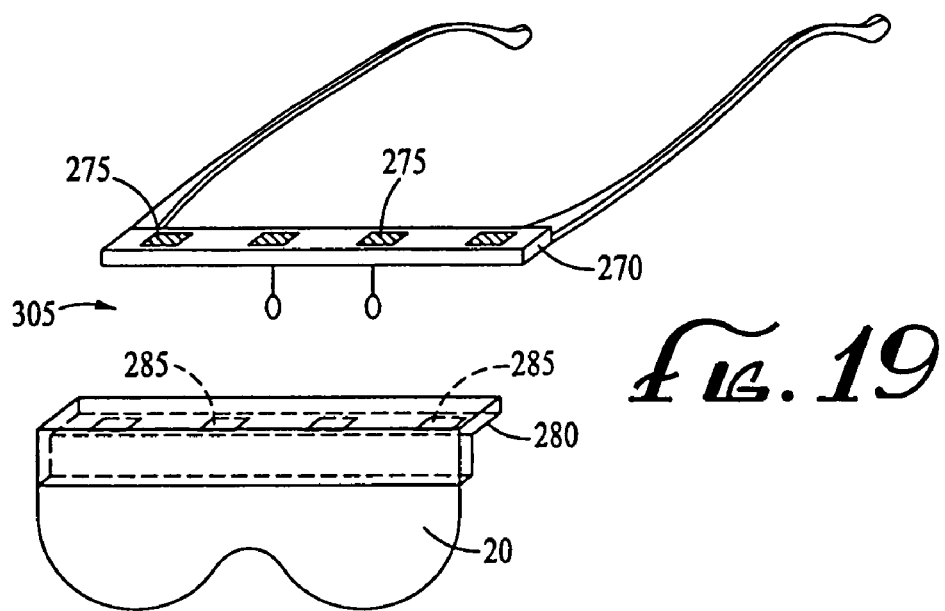
FIG. 19 shows an exploded view of another embodiment of the invention where the lens frame is removably attached to the top of the eyewear platform using magnets.

The lens frame 10 has at least one lens 20, as shown in FIGS. 17 and 19. FIG. 1 shows a lens frame housing two lenses 20. The lens frame 10 can either encompass the entire lens as shown in FIG. 1, or the lens frame 10 can be attached to only one part of the lens circumference 25. At the terminal ends of the lens frame 10 are terminal lens frame ends 30. Each of the terminal lens frame ends 30 has an appendage 35. The appendages 35 as shown in FIG. 1 curve and bend to align with the temple extensions 40 of the eyewear platform 15. The appendages 35 further comprise an appendage socket 45; the appendage sockets 45 have a first appendage socket surface 50 and a second appendage socket surface 55. The appendage socket 45 can be aligned and mounted in various positions on the lens frame 10, including being mounted horizontally (FIGS. 1–6) or vertically (FIG. 7).

The appendage socket 45 further comprises at least one magnet 60. This magnet 60 can be situated in a variety of different locations on the appendage socket 45; said magnet 60 has a magnet contact surface 65. FIGS. 1–6 show the magnet 60 lies within and is surrounded by the appendage socket 45; the magnet contact surface 65 can lie flush with either the first or second appendage socket surfaces 50, 55. Also, the magnet 60 may lie above the appendage socket surfaces 50, 55 to create another elevation 70 on said appendage socket 45. The magnet 60 may also lie below the appendage socket surfaces 50, 55 to create an appendage socket depression 75. Additionally, there can be multiple magnets in the appendage socket 45. Further, the magnets do not need to be surrounded by the appendage socket 45.

Eyewear Platform

Referring to FIGS. 1 and 4, the eyewear platform 15 has an elongated shape. The eyewear platform 15 includes two temple extensions 40, which are capable of being placed over a user's ears, and a bridge portion 77, which is pivotally connected to each of the temple extensions 40, wherein the bridge portion 77 is capable of resting on a user's nose to permit the eyewear platform 15 to be worn by a user. The eyewear platform 15 also has platform arms 80 located at the ends of the eyewear platform 15. These platform arms 80 can curve and bend to mimic the appendages 35 on the lens frame 10 and to align with the temple extensions 40 such that the lens frame 10 will properly fit against the eyewear platform 15. Both the appendages and the platform arms 80 can provide a mounting surface for the various attachment devices, such as magnets, clips, clasps, snap, hook, and straps for the invention. For example, in FIG. 1, the platform arm 80 further comprises a temple socket 85, which has a first temple socket surface 90 and a second temple socket surface 95. The temple socket 85 can be aligned and mounted in various positions on the platform arm, including being mounted horizontally (FIGS. 1–6) or vertically (FIG. 7).

The temple socket 85 further comprises at least one magnet 100. This magnet 61 can be situated in a variety of different locations on the temple socket 85; said temple socket magnet 100 has a magnet contact surface 105. FIGS. 1–6 show the temple socket magnet 100 lies within and is surrounded by the temple socket 85; the magnet contact surface 105 can lie flush with either the first or second temple socket surfaces 90, 95. Also, the magnet 100 may lie above the temple socket surfaces 90, 95 to create another elevation 110 on said temple socket. The magnet 100 may also lie below the temple socket surfaces 90, 95 to create a temple socket depression 115. Additionally, there can be multiple magnets in the temple socket. Further, the magnets do not need to be completely surrounded by the temple socket 85.

The eyewear platform 15 can also have a single or a pair of nose pads 120, 120' attached to a midpoint 125 on the eyewear platform 15. The temple 40 can also be adjustably connected to the platform arms 80 with a variety of different adjustable connections 130 such as a spring, a hinge, or a joint can be used.

Attachment of Lens Frame to Eyewear Platform

To attach the lens frame 10 to the eyewear platform 15, the magnet 100 in the temple socket 85 is oriented to couple, to mate, and to contact the magnet 60 in the appendage socket 45 such that the maximum magnetic attractive force along an axis 135 of said magnets 60 and 100; in FIG. 1–3, this axis 135 is oriented vertically parallel to the lens frame 10. The temple socket magnet 100 engages and mates with the appendage socket magnet 60 to provide an effective resistance from said lens frame 10 from becoming involuntarily detached from said eyewear platform 15. In the embodiments shown in FIG. 1–24, magnets are used to removably attach the lens frame 10 to the eyewear platform 15.

To achieve the maximum attractive force, the magnets in the appendage and the temple sockets 85 need to be aligned along the same axis 135. By orienting, mating, coupling, and contacting both the temple socket magnet 100 and the appendage socket magnets 60 together along the same axis, the user can maximize the magnetic attractive force. Thus, as long as the temple socket magnet 100 is aligned, coupled, or mated with the appendage socket magnet 60, then these magnets can be placed at virtually a myriad of angles and positions on the lens frame and the eyewear platform. As a result, the magnet axis 135 will change according to the mounting angle of the magnets.

Additionally, in the embodiments shown in FIGS. 1–24, there are at least two magnets mated and paired with one another. In the alternative, this invention is not limited to having two magnets mated and paired with one another. This mounting of the lens frame to the eyewear platform can be accomplished with only one magnet on either the lens frame or the eyewear platform. This single magnet can magnetically attach to a corresponding metallic surface.

In addition to the different angles of mounting the magnets on the appendage and temple sockets, the mounting of the lens frame relative to the eyewear platform can be changed. FIGS. 1–3 show the lens frame 10 mounted below the eyewear platform 15. FIG. 2 shows the second temple socket surface 95 and the contact surface 107 of temple socket magnet 100 making contact against the first appendage socket surface 50 and the first contact surface 65 of the appendage socket magnet 60 so that said magnets 100 and 60 are aligned to provide effective resistance from said lens frame 10 from becoming involuntarily detached from said eyewear platform 15. FIG. 3 shows the first contact surface of the appendage socket magnet 60 making contact with the second contact surface of the temple socket magnet 100 within the depression 115 of the temple socket 85. The temple socket depression 115 or a similar appendage depression socket allows for some greater resistance from horizontal or side-to-side displacement.

Alternatively, FIGS. 3 through 6 show the lens frame 10 mounted above the eyewear platform 15. FIG. 5 shows the second contact surface 67 of the appendage socket magnet 60 and the second surface 55 of the appendage socket 45 making contact with the first contact surface 107 of the temple socket magnet 100 and the first temple socket surface 95 so that said magnets are aligned providing effective resistance from said lens frame from becoming involuntarily detached from said eyewear platform. FIG. 6 shows the second contact surface 67 of the appendage socket magnet 60 making contact with the first contact surface 105 of the temple socket magnet within a temple socket depression 115. The temple socket depression 115 or a similar appendage depression socket allows for some greater resistance from horizontal or side-to-side displacement. Additionally, the magnet contact surfaces that are not being used can be covered with a protective covering, coating, or paint.

Lateral Attachments at the Temples Outside Position

FIG. 7 shows another embodiment of the invention where the appendage 35 of the lens frame 10 and the temple socket 85 of the eyewear platform 15 are oriented at a different angle than the embodiments in FIGS. 1 through 6. FIGS. 1 through 6 have the appendage and the temple socket horizontally mounted, but FIG. 7 shows the appendage and the temple socket vertically mounted. The appendage and the temple socket can be mounted at different angles so long as the magnets are aligned respective to one another to provide effective resistance from said lens frame from becoming involuntarily detached from the eyewear platform or as long as the maximum amount of contact of the magnets in both the appendage and temple socket is maintained. By orienting, mating, and contacting both the temple socket magnet 100 and the appendage socket magnet 60 together along the same magnet axis, the user can maximize the magnetic attractive force. The appendage socket 45 and the temple socket 85 can be in different shapes, including circles, square, rectangles, or ovals.

FIG. 7 shows an exploded view of the invention where the second contact surface 67 of the appendage socket magnet and the second appendage socket surface 55 are aligned to contact the first contact surface 105 of the temple socket magnet 100 and the first temple socket surface 90 so that said magnets are aligned providing effective resistance from said lens frame from becoming involuntarily detached from said eyewear platform. In this embodiment, to properly attach the lens frame to the eyewear platform, the magnets in both the appendage socket and the template socket should preferably align along a common magnet axis to achieve the best magnetic connection.

Inside Position

In addition, in another embodiment of the invention, the second contact surface 107 of the temple socket magnet 100 and the second temple socket surface 95 are aligned to contact the first appendage socket magnet surface 65 and the first appendage socket surface 50 so that said magnets 60 and 100 are aligned providing effective resistance from said lens frame 10 from becoming involuntarily detached from said eyewear platform 15. As described, the appendage socket 45 and the temple socket 85 can be placed at different positions relative to one another: inside or outside positions.

Prong Attachment at Temples

Figure 8:
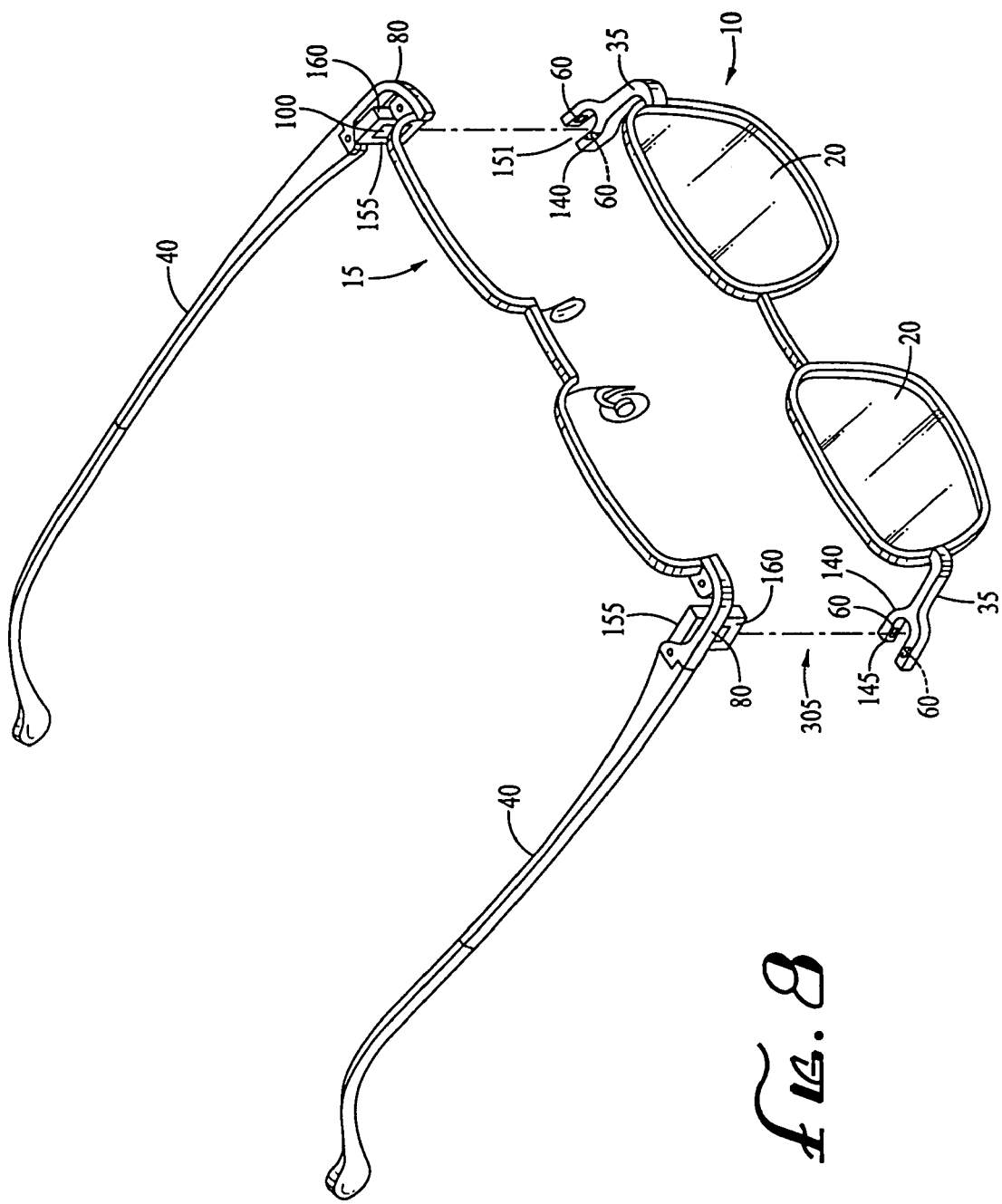
FIG. 8 shows an exploded view of another embodiment of the invention where the appendage prong is aligned to contact the vertically aligned temple socket.

FIG. 8 shows another embodiment of the invention where the appendage 35 of the lens frame 10 further comprises an appendage prong 140, which has an appendage prong surface 145 and a plurality of prong digits 150. FIG. 8 shows two prong digits 150, but the appendage prong surface 145 can have more than two prong digits 150. The appendage prong surface 145 has at least one magnet 60. This magnet 60 can be flush with the appendage prong surface 145 or can be placed at a lower or higher elevation with respect to the appendage prong surface 145.

FIG. 8 also shows a platform arm extension 155 with at least one platform arm extension surface 160 and at least one magnet 100, which can contact the surface 160 of the platform arm extension 155. The prong digits 150 form a space 151 within the appendage prong 140 to allow the platform arm extension 155 to fit securely between the prong digits 150.

To attach the lens frame 10 to the eyewear platform 15 for this embodiment, at least one magnet 60 on said appendage prong 140 is mated and aligned with at least one magnet 100 on said platform arm extension surface 160 such that these magnets 60 and 100 are aligned to provide effective resistance from the lens frame 10 from becoming involuntarily detached from the eyewear platform 15.

FIG. 9 shows another embodiment of the invention where the platform arm 80 further comprises a platform arm prong 165, which has a platform arm prong surface 170 and a plurality of prong digits 150. FIGS. 9 and 10 show two prong digits 150, but the platform arm prong surface 170 can have more than two prong digits 150. The platform arm prong surface 170 has at least one magnet 100; FIG. 10 shows each prong having a magnet 100. Magnet 100 can be flush with the platform arm prong surface 170 or at a lower or higher elevation with respect to the platform arm prong surface 170.

FIG. 9 also shows the appendages 35 with appendage sockets 45 with at least one magnet 60. Like the previous embodiments described above, the appendage socket 45 has a first appendage socket surface 50 and a second appendage socket surface 55. This magnet 60 can be located at or near both of the first and second appendage socket surfaces 45, 50. In the embodiment of FIGS. 9 and 10, the magnet 60 will be able to contact both magnets 100 on the platform arm prong surface. The prong digits 150 form a space 152 within the platform arm prong surface 170 to allow the appendage socket 45 to fit securely between the prong digits 150.

To attach the lens frame to the eyewear platform for this embodiment, at least one magnet 100 on said platform arm prong is mated and aligned with at least one magnet 60 on said appendage socket such that these magnets 60 and 100 are aligned to provide effective resistance from the lens frame 10 from becoming involuntarily detached from the eyewear platform 15.

Horizontal Prong on Temples

FIGS. 11 and 12 show another embodiment of the invention where an appendage prong 140 is located and oriented horizontally as compared to the vertical placement of the embodiments shown in FIGS. 8 through 10. This horizontally mounted appendage prong 140 mates and couples with a horizontally placed temple socket 85 in a similar fashion to the embodiments shown in FIGS. 8 through 10.

Nose Mount

Figure 13:
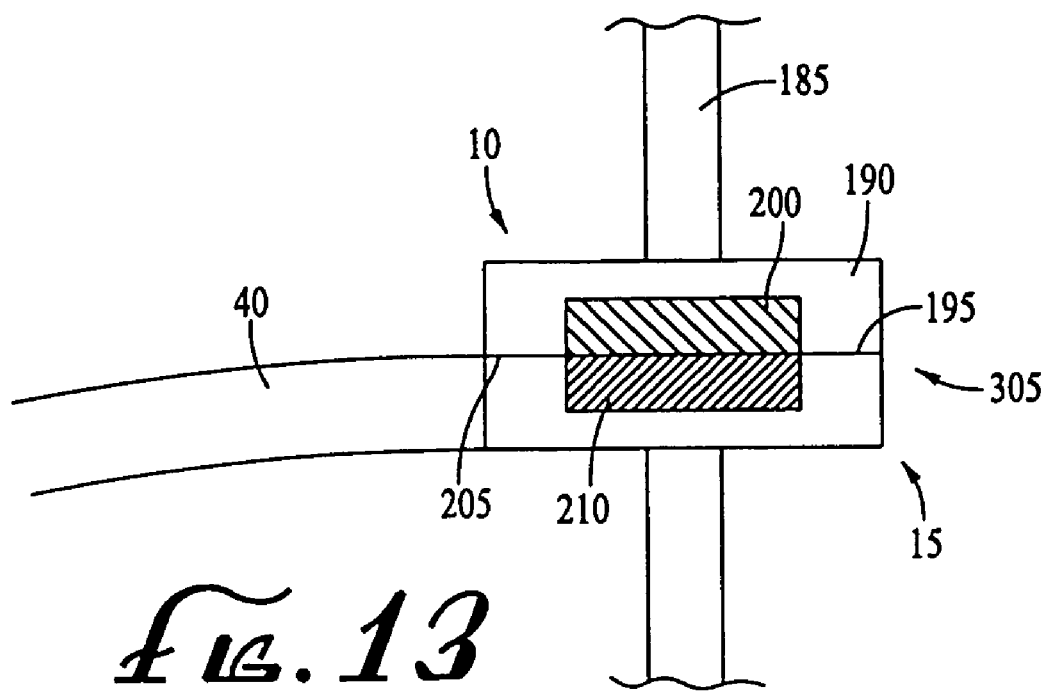
FIG. 13 shows a side view of a "top mount" of the lens frame on top of the eyewear platform at the nose bridge.
Figure 14:
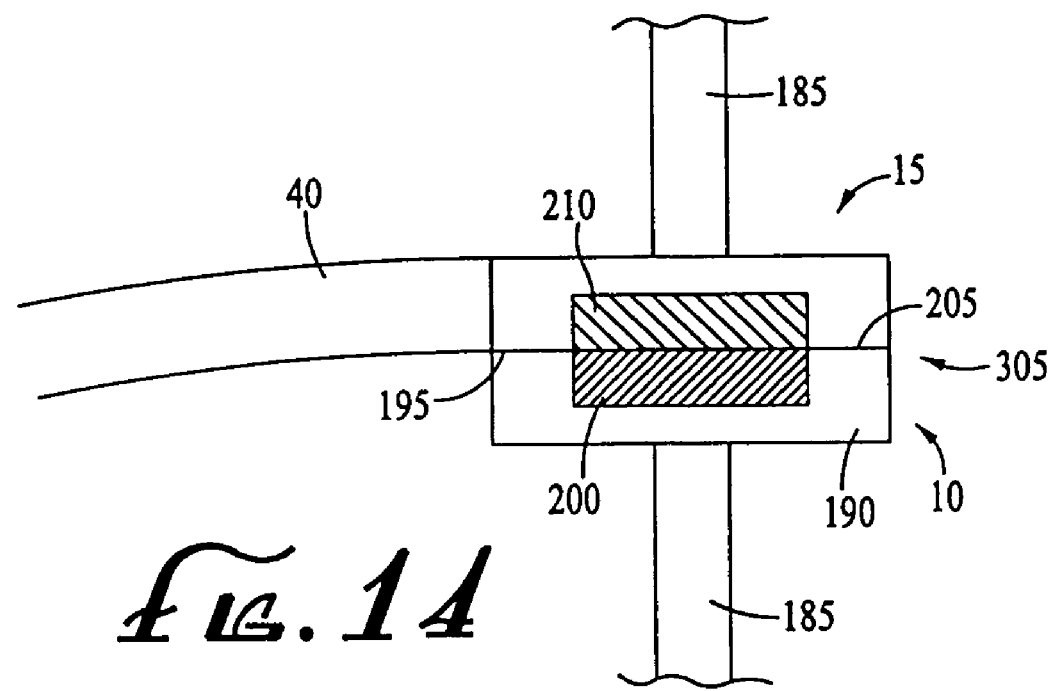
FIG. 14 shows a side view of a "bottom mount" of the lens frame on top of the eyewear platform at the nose bridge.

FIGS. 13 and 14 show additional embodiments of the invention where the eyewear platform and the lens frame connect and couple at an interface 305 at the nose bridge 175 or the center 180 of the eyeglasses 5. The lens frame has at least one lens 185. Depending on the eyewear apparatus design and functional need, this invention can be applied to eyewear with one lens or multiple lenses. For multiple lenses, a lens connector 190 connects the lenses 185, 185' together in the lens frame 10. The lens frame 10 has a lens connector contact surface 195 and at least one magnet 200. The eyewear platform 15 has an eyewear bridge attachment surface 205 and at least one magnet 210.

To connect the lens frame 10 to the eyewear platform 15, the user will mate and couple the magnet 210 of the eyewear bridge attachment surface 205 with the magnet 200 of the lens connector contact surface 195 at an interface 305 so that said magnets 210 and 200 are aligned and provide effective resistance from said lens frame 10 from becoming involuntarily detached from said eyewear platform 15.

In FIG. 13, the lens frame 10 fits on top of the eyewear platform 15; in FIG. 14, the lens frame 10 fits underneath the eyewear platform 15. As a result, depending on the embodiment, in the eyewear apparatus, the lens frame 10 can be at a first elevation and the eyewear bridge 15 can be at a second elevation. If the lens frame fits on top of the eyewear platform, as in FIG. 13, the lens connector contact surface 195 is at a higher elevation relative to the elevation of the eyewear bridge attachment surface 205. Accordingly if the lens frame 10 fits underneath the eyewear bridge 15, as in FIG. 14, the lens connector contact surface 195 is at a lower elevation than the elevation of the eyewear bridge attachment surface 205.

This magnetic connection at the nose bridge or center of the eyeglasses can be combined with any of the attachment apparatus and methods described in this application.

Prong at Nose

FIGS. 15 and 16 show additional embodiments where the lens frame is removably connected to the eyewear platform at the nose bridge with a prong that can be mounted on either the eyewear platform or the lens frame. FIG. 15 shows the eyewear platform having an eyewear platform prong 215 with at least one eyewear platform prong surface 220. The eyewear platform prong 215 also has at least one magnet 225 and a plurality of digits 230; FIG. 15 shows the prong 215 with two magnets 225 and two digits 230. These digits 230 form a space 235 within the eyewear platform prong 215 to fit around the lens connector 190 on the lens frame 10. The lens connector 190 has at least one lens connector contact surface 195 and at least one magnet 200 in the lens connector 190. FIG. 15 shows one magnet 200 that passes through the lens connector 190 to mate with the magnets 225 on the eyewear platform prong 215. As with the embodiments discussed above, the magnets on the eyewear platform and the lens frame need to be oriented and aligned with respect to one another so that the magnets contact and provide effective resistance from the lens frame from becoming involuntarily detached from the eyewear platform. Also, there can be more than two digits 230 on the eyewear platform prong.

FIG. 16 shows another embodiment of the prong-type attachment. The lens frame 10 has a lens connector 190 with a lens connector prong 240 with at least one lens connector contact surface 195 and at least one magnet 200 in the lens connector 190. The lens connector prong 240 has a plurality of digits 245, which form a space 250 within the lens connector prong 240. The eyewear platform 15 has a platform nose extension 255 located near the center 180 of the eyewear or eyeglasses 5 and corresponds to the location of the lens connector prong 240 on the lens frame 10. The platform nose extension 255 has an extension surface 260 and at least one magnet 265. The platform nose extension 255 fits within the space 250 within the lens connector prong 240. As shown in FIG. 16, to connect the lens frame 10, which has at least one lens 185, to the eyewear platform 15, the user aligns the magnets 200 in the lens connector prong 240 with the magnet 210 in the eyewear platform nose extension 255 at an interface 305 so that said magnets provide effective resistance from said lens frame 10 from becoming involuntarily detached from said eyewear platform 15.

As with the embodiments described above, the prong-type attachment located at the center 180 or at the terminal ends of the eyewear or eyeglasses can be combined with the other embodiments of the invention as shown in FIGS. 1–13. These embodiments can be combined with non-magnetic attachment devices such as clips, snaps, clasps, hooks, straps, or Velcro attachments as well.

FIGS. 17 through 25 show another group of embodiments of the invention. The lens frame 10 is removably connected to an eyewear platform 15 having two temple extensions 40. The eyewear platform 15 has at least one eyewear platform attachment surface or platform contact surface 270 and at least one magnet 275. The lens frame 10 has at least one lens 20, at least one lens frame contact surface 280, and at least one magnet 285. The lens frame 10 can be removably attached to the eyewear platform 15 with simply one magnet, which can be located on either the eyewear platform or the lens frame, at an interface 305.

Figure 18:
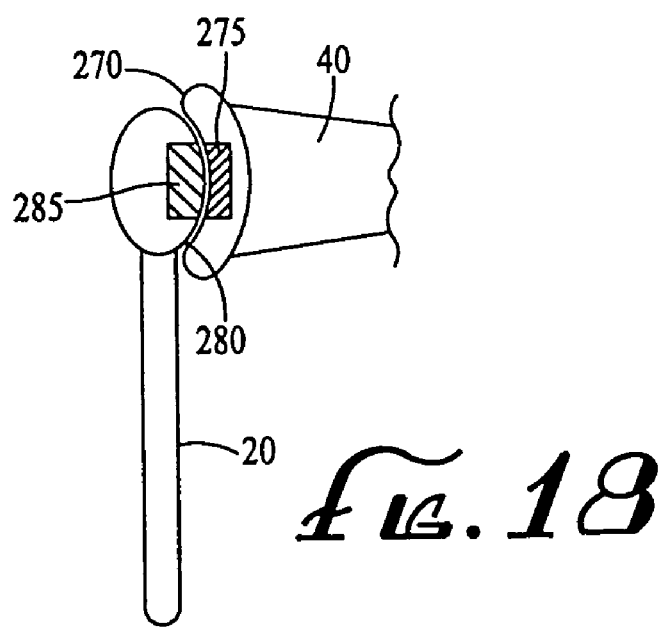
FIG. 18 shows a side view of the embodiment of FIG. 17.

In FIG. 17, the eyewear platform 15 has several magnets that are present on the platform contact surface 270. These magnets 275 are placed and oriented to mate and to couple the several magnets 285 on the lens frame 10 and the lens frame contact surface 280. FIG. 18 shows that depending on the particular style of the eyewear, there can be at least one platform contact surface 270 and at least one lens frame contact surface 280.

This eyeglass invention allows the platform contact surface 270 to couple or to mate with the lens frame contact surface 280 at an interface 305. As a result, the lens frame 10 is capable of removably engaging the eyewear platform 15 so as to permit a user, who is wearing the eyewear platform 15, to see through the lenses 20, and a user may change the lenses 20 of the eyeglasses 5 to suit the user's needs. Further, this invention allows the lens frame 10 to be removably connected to the eyewear platform 15 with at least one magnet at an interface 305 between the contact surfaces.

Additionally, in the embodiments shown in FIGS. 1–24 and 27–30, there are at least two magnets (one magnet on the lens frame and another magnet on the eyewear platform) mated and paired with one another. In the alternative, this invention is not limited to having two magnets mated and paired with one another. This mounting of the lens frame to the eyewear platform can be accomplished with only one magnet on either the lens frame or the eyewear platform. A single magnet can attach to a receiving metallic surface. As a result, the lens frame 10 can be removably connected to the eyewear platform 15 with at least one magnet at the interface between the contact surfaces.

Figure 20:
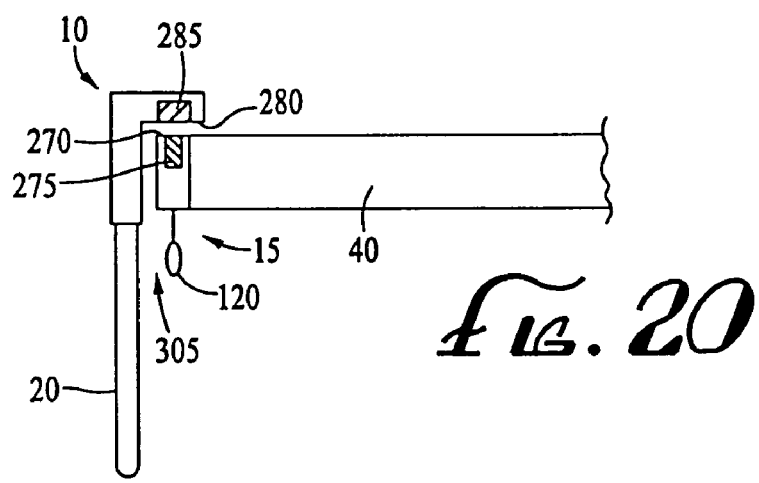
FIG. 20 shows a side view of the embodiment of FIG. 19.
Figure 21:
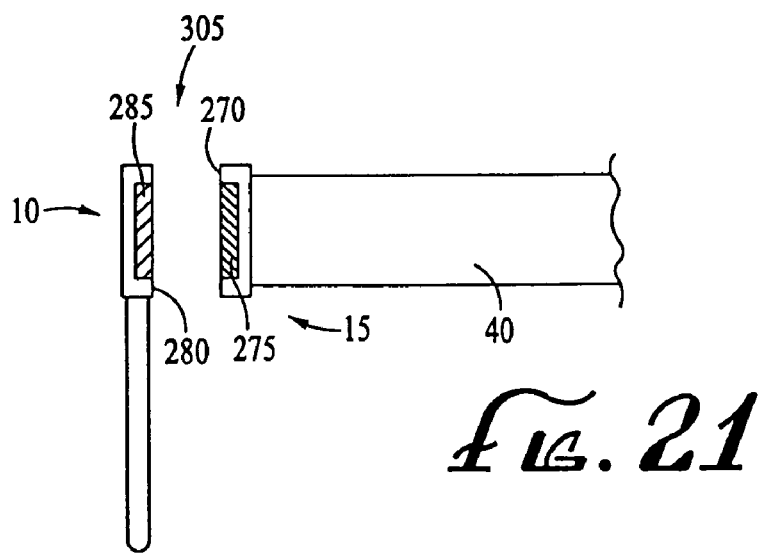
FIG. 21 shows a side view of another embodiment of FIG. 17.

FIGS. 19 through 24 show different embodiments of attachments available for this invention. In all of these embodiments, a lens frame 10 is removably attached to an eyewear platform 15 with at least one magnet. FIGS. 19 and 20 show the lens frame removably mounted above and partially over the eyewear platform. In this embodiment, the lens frame has more than one lens frame contact surface 280 and fits like a shelf over the eyewear platform, which has more than one eyewear platform attachment surface. The magnets on both the eyewear platform and the lens frame can be placed on different locations so that said magnets are aligned providing effective resistance from said lens frame from becoming involuntarily detached from said eyewear platform.

As shown in FIGS. 27 and 28, the lens frame 10 can be removably attached to the eyewear platform 15 wherein the appendage socket 45 reaches over the platform arm 80 and the temple socket 85 such that the appendage socket magnet 60 aligns and couples with the temple socket magnet 100 at an interface 305 and said magnets provide effective resistance from said lens frame 10 from becoming involuntarily detached from said eyewear platform 15. The interface 305 is parallel with the face of the user or the lenses.

In addition, in another embodiment, the appendage socket 45 can also reach under the platform arm 80 and the temple socket 85 such that the appendage socket magnet 60 aligns and couples with the temple socket magnet 100 at an interface 305 and said magnets provide effective resistance from said lens frame 10 from becoming involuntarily detached from said eyewear platform 15. Also, the interface between the magnets is parallel with the face of the user or the lenses.

Similar to the embodiments shown in FIGS. 27 and 28, the embodiments of FIGS. 29 and 30 also have the lens frame 10 and an extension of the lens connector 190 to reach either over or under the center 180 of the eyeglasses 5, such that the lens frame magnet 200 aligns and couples with the magnet 210 of the eyewear bridge attachment surface 205 at an interface 305 and said magnets provide effective resistance from said lens frame 10 from becoming involuntarily detached from said eyewear platform 15. In FIGS. 27 through 30, the interface 305 is parallel with the face of the user or the lenses 185.

Clip Attachment

Figure 25:
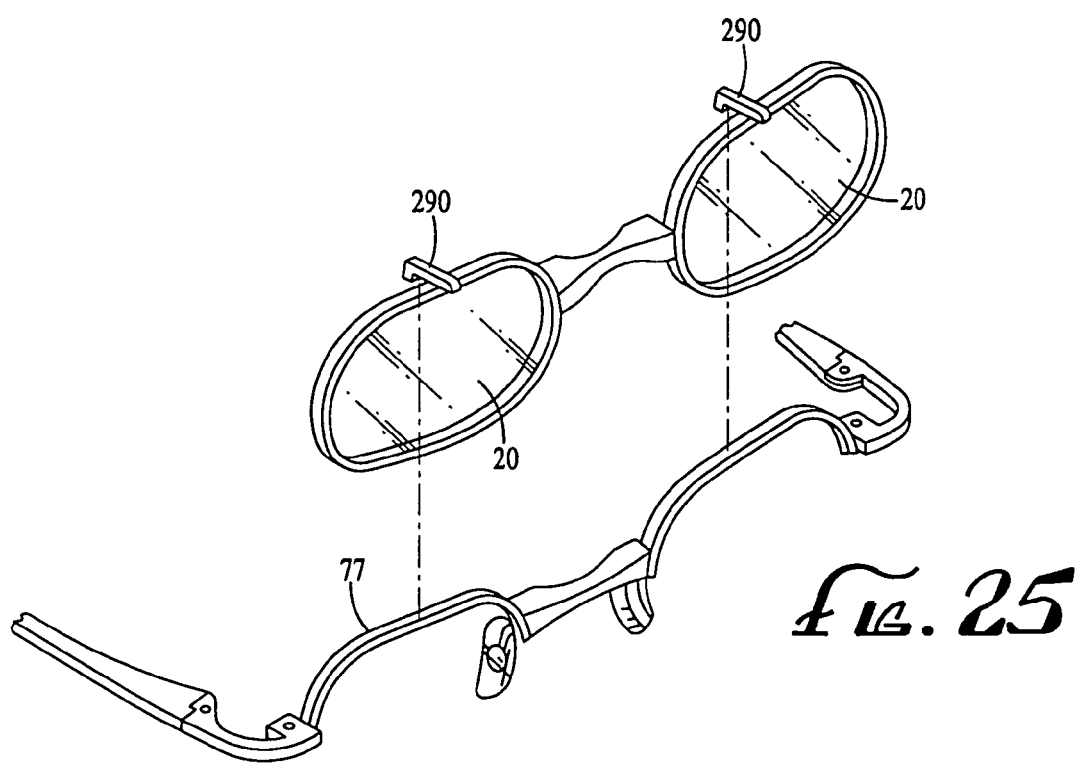
FIG. 25 shows an exploded view of another embodiment where the lens frame is removably attached to the eyewear platform with clips and without magnets.

As shown in FIG. 25, the lens frame 10 can be easily attached to the eyewear platform 15 with clips 290. FIG. 25 shows two clips 290 located on the lens frame 10. There can be a multiple number of clips 290 located at different locations on the lens frame 10. These clips 290 mate and removably connect the lens frame 10 to the eyewear platform 15. The embodiment shows that the removable lens frame and eyewear platform assembly can be employed without the use of non-magnetic attachments. However, these clips 290 or other non-magnetic attachments may be used in combination with magnets to removably attach the lens frame 10 to the eyewear platform 15. As a result, the lens frame 10 can be removably connected to the eyewear platform 15 with at least one clip attachment at the interface 305 between the contact surfaces.

Plug Attachment

As shown in FIG. 26, the lens frame 10 can be easily attached to the eyewear platform 15 with a piece or plug 295 on the ends of the lens frame 10; this piece or plug 295 mates and fill a space defined by a slot or channel 300, which are parallel with a horizontal axis formed by the temple extensions. This piece or plug 295 can fit securely within these slots or channels 300 to provide effective resistance from the lens frame 10 from becoming involuntarily detached from the eyewear platform 15. This attachment embodiment can be used with or without the other attachment devices: magnets, clips, straps, clasps, or Velcro as described above.

In the alternative, each of said platform prongs has a piece or a plug 295 as well. This piece or plug 295 mate and connect with channels or slots on said appendage of said terminal lens frame end; these channels define a space wherein said piece or plug of said platform prong can fit securely and provide effective resistance from said lens frame from becoming involuntarily detached from said eyewear platform.

Materials

The eyewear platform and lens frame can be made of a variety of materials including but not limited to metals, alloys, carbon fibers, plastics and other lightweight and strong composite materials. In addition, the eyewear platform and lens frame can also be made of materials that allow a certain amount of resilience, elasticity, or "give" to enable the eyewear to be able to take the rigors of use. Both the eyewear platform and the lens frame can assume a variety of shapes and sizes depending on the specific design or need of the user. Also, both the eyewear platform and lens frame can be each made of one piece.

Also, this invention allows for effective and easy replacement of safety glasses and eyewear. By allowing for removable attachment of a lens frame with safety lenses, it is possible for the user to easily wear and to change safety lenses after these lenses become dirty, scratched, or broken. Also, the user will save money in simply replacing this lens frame instead of the entire safety eyeglasses.

Lenses Mounted Behind the Bridge Portion of the Eyewear Platform

In this embodiment as shown in FIG. 31–35, there are illustrated eyeglasses 5 with lenses 20 removably attached and connected to an eyewear platform 15. In the embodiments shown in FIG. 31–35, the lenses 20 sit behind the eyewear platform 15. These lenses 20 can be attached to the eyewear platform 15 using similar magnet attachments on the appendages 35 and platform arms 80 as described above and shown in FIG. 1–6. In addition, these lenses 20 can also be removably connected to the bridge portion 77 of the eyewear platform 15 with magnets 310, 312 on the lenses 20 themselves. The lenses 20 can also be connected to the bridge portion 77 of the eyewear platform 15 with other non-magnetic connection devices such as clips or snap connection devices.

Two Lenses with a Lens Connector and Magnets

FIG. 31–35 show two lenses removably connected to an eyewear platform 15. The eyewear platform 15 has two temple extensions 40, which are capable of being placed over a user's ears, and a bridge portion 77 of the eyewear platform 15, which is pivotally connected to each of said temple extensions 40, wherein said bridge portion 77 is capable of resting on a user's nose to permit said eyewear platform 15 to be worn by a user.

The two lenses 20 are connected to each other with a lens connector 190. The two lenses can be magnetically attachable to an attachment surface on the eyewear platform 15 so as to permit a user wearing said eyewear platform 15 to see through the lenses 20, whereby a user may change the lenses of the eyeglasses to suit the user's needs.

Lens Connector

The lens connector 190 has two ends 305. These terminal lens connector ends 305 engage the inner sides 320 of the lenses. The lens connector 190 can be fixedly connected to the lenses 20 with adhesive, glue, bolts, or screws. The lens connector ends 305 can be secured to the lens 20 with a screw or a bolt 325. In addition, the lens connector ends 305 can also fit into slots formed on either the surface or the sides of the lenses 20. These slots or channels can allow the lens connector ends to be securely fastened to the lenses 20. The lens 20 has a first or outer surface 315 and a second or inner surface 320.

Nose Pads on Lens Connector

Both the lens connector 190 and the eyewear platform 15 are capable of resting on the user's nose. Accordingly, nose pads 120 can be attached to either the lens connector 190 or the eyewear platform 15. If the nose pad 120 is attached to the lens connector 190, then the lens connector 190 is capable of resting on a user's nose to permit the eyeglasses to be worn by a user.

Nose Pad on the Bridge Portion

The nose pad 120 can be attached to the bridge portion 77 of the eyewear platform 15, and the bridge portion 77 is capable of resting on a user's nose to permit the eyeglasses to be worn by a user. As shown in FIG. 33–35, the combination of the nose pad 120 attached to the bridge portion 77 results in forming a space 335 wherein the lens connector 190 and the lenses 20 can fit. This space 335 acts as a receptacle wherein the lens connector 190 can fit snugly and firmly, helping to secure the lenses to the eyewear platform 15, and provide effective resistance from said lenses 20 becoming involuntarily detached from the eyewear platform 15. This configuration has the nose pads 120 extending from the bridge portion 77 of the eyewear platform 15 and over the lens connector 190. Further, in order to customize the fit between the lens connector 190 and the bridge portion 77, there can also be small notches 345 on the top surface of the lens connector 190. These notches 345 allow the bridge portion to fit over and to sit slightly below the top surface of the lens connector 190.

As a result, in conjunction with any of the magnetic or non-magnetic attachment devices, which have been described above, the user will place the lens connector 190 into the space 335 formed from the nose pads 120 and the bridge portion 77 of the eyewear platform 15. This space 355 provides some resistance along a horizontal axis 136 and helps the lenses 20 to stay in place until the user wants to remove the lenses 20 from the eyewear platform 15.

Magnets on Temple Sockets/Appendages

As shown in FIG. 31–35, this eyeglass embodiment can incorporate the magnetic attachments as shown in FIG. 1–3 and described above; there are platform arms 80 on the eyewear platform, which couple and mate with appendages 35, which are connected to the lenses 20. To attach the lens frame 10 to the eyewear platform 15, the magnet 100 in the temple socket 85 is oriented to mate with the magnet 60 in the appendage socket 45 such that an effective magnetic attractive force along an axis 135 of said magnets 60 and 100 is achieved. The temple socket magnet 100 engages and mates with the appendage socket magnet 60 to provide effective resistance from said lenses 20 from becoming involuntarily detached from said eyewear platform 15.

As described above, either the temple socket or the appendage sockets can have depressions, wherein the particular magnet may sit within a depression formed in the other socket. For example, as in FIG. 34, the magnet of the appendage socket can lie above the surface of the appendage to create another elevation. This "elevated" appendage socket magnet fits within a depression or a concave area of the temple socket so that there is some resistance along the horizontal axis and so that there is further resistance from the lenses from becoming involuntarily detached from the eyewear platform.

Eyewear Platform Surfaces

The eyewear platform 15 has at least one platform contact surface 270 or eyewear platform attachment surface 270. This platform contact surface 270 further has a first or outer surface 271 and a second or inner surface 272. This eyewear platform 15 and its bridge portion 77 can also have magnets 275. These magnets 275 can be placed on different locations on the bridge portion 77.

The bridge portion 77 can also be made of a material, including not limited to metals or alloys, which provide a surface wherein magnets may attach to form a magnetic connection and to provide effective resistance for the lenses 20 from becoming involuntarily detached from the eyewear platform 15.

Magnets on the Lens Connector Ends

In another embodiment of the invention, the ends 305 of the lens connector 190 not only connect to the lenses, but these ends 305 also can be connected to magnets 310, which can lie on the outer or first surface of the lenses. These magnets 310 can be placed partially within the lens 20 such that a portion of the magnet 310 lies above the outer surface 315. In addition, these magnets can be placed within the lenses 20 in order to lie flush with the outer or first surface of the lenses 20.

In another embodiment, these magnets 310 can be placed and affixed to the outer or first surface 315 of the lenses 20 with glue or adhesive. These magnets 310 can be connected to a small screw or bolt 325 that passes through the lens 20 and extends to the end of the lens connector 190 on the inner surface 320 of the lens 20.

Magnets on the Appendages Lens Connection Ends

The appendage 35 has appendage lens connection ends 330; these connection ends 330 contact and secure the appendages 35 to the lenses 20. As shown in FIG. 31–32, the appendage lens connection end 330 is attached to the inner or second surface 320 of the lenses 20. The appendage 35 is connected to the inner surface 320 with a variety of connectors, including but not limited to, adhesives, clips, bolts, and screws.

There can also be at least one magnet 312, which is located on the outer surface 315 of the lenses 20 and approximately near the appendages 35. In this embodiment, the magnet 312 can be attached to the appendage lens connection ends 330 with a variety of different connection devices, including but not limited to screws, bolts, or adhesive. A magnet 312 is attached to the appendage lens connection end 330 with a screw or bolt 325. The screw or bolt 327 connects the appendage lens connection end 330 with the magnet 312.

The magnet 312 can be similar in size, shape, and elevation to the magnet 310. The magnet 312 can be placed either on top of the lenses 20 or within the thickness of the lenses 20 as long as the magnet 312 can make contact with a magnet 275 or a magnetically attachable surface on the eyewear platform 15.

In another embodiment, these magnets 312 can be placed and affixed to the outer surface 315 of the lenses 20 with glue or adhesive. These magnets 312 can be connected to the outer surface of the lens 20 with a small screw or bolt 327 that passes through the lens 20 and extends to the appendage lens connection end 330 on the inner surface 320 of the lens 20. Also, these magnets 312 can be placed partially within the lens 20 such that a portion of a magnet 312 lies above the outer surface 315.

These magnets 310, 312 will couple with either the eyewear platform surface 270, or magnets 275 on the eyewear platform surface 270, so that the magnets 310, 312 provide effective resistance from said lenses 20 from becoming involuntarily detached from said eyewear platform 15. These magnets 310, 312 can also lie along a horizontal axis 136, which is parallel to the temple extensions 40.

In this embodiment, the lenses 20 sit behind the eyewear platform 15. Because the lenses 20 fit behind the eyewear platform, the magnets 310, 312 are substantially covered so that the magnets 310, 312 are completely blocked from view. Also, based on the placement of the magnets 310, 312, the magnets can be concealed from view. The placement of the magnets 310, 312 on the lenses 20 and the eyewear platform 15 can be adjusted to provide an ideal fit for functionality of magnetic attachment and aesthetic presentation. Further, the combination of the eyewear platform 15 and the lenses 20 can also be configured to minimize the exposure of any bolts or magnets.

These magnets 310, 312 mate and couple with the eyewear platform surface 270 or magnets 275 on the eyewear platform surface so that said magnets 310, 312 help to provide effective resistance from said lenses 20 from becoming involuntarily detached from said eyewear platform 15. The advantage of this combination of attachments allow for simultaneous attachment on different planes: along the vertical axis 135, there are magnetic attachments between the temple socket and the appendage socket; along the horizontal axis 136, the magnets 310, 312 align and couple with either the eyewear platform attachment surface 270 or magnets 270 in the eyewear platform 15.

One Lens

In another embodiment of this invention, the embodiment as shown in FIG. 31–32 is also possible with one integrated lens. Depending on the design of the lens, it is possible for a support piece 350, which can fit into the space 335 formed by the bridge portion 77 and the nose pads 120. This one-lens configuration can be used with the magnetic attachments as shown in FIG. 1–3.

Attachment of the Lenses to the Eyewear Platform Using Magnets on the Lenses

To connect the eyewear platform to the lenses 20, the user will align the magnets 100, 60 in the appendage and temple sockets along the vertical axis 135. By orienting the temple socket magnet 100 with the appendage socket magnet 60, the user can achieve an effective magnetic attractive force. Thus, as long as the temple socket magnet 100 is aligned and coupled with the appendage socket magnet 60, then these magnets 100, 60 can be placed at virtually a myriad of angles and positions on the lens frame and the eyewear platform. As a result, the magnet axis 135 will change according to the mounting angle of the magnets.

Further, in conjunction with the magnetic connections, the lenses are aligned with the eyewear platform 15 so that the lens connector 190 fits within the space 335 formed by the bridge portion 77 and the nose pads 120. This mating of the lens connector 190 with the space 335 of the eyewear platform 15 further provides resistance that prevents the lenses from becoming involuntarily detached from the eyewear platform.

Additionally, in the embodiments of FIGS. 1–35, there are at least two magnets mated and paired with one another. However, this invention is not limited to having two magnets mated and paired with one another. This mounting of the lenses to the eyewear platform can be accomplished with non-magnetic attachments, including but not limited to, clips, prongs, or plugs on the temples with or without the "clip" formed from the space 335 created with the bridge portion 77 and the nose pads 120.

In addition to the different angles of mounting the magnets on the appendage and temple sockets, the mounting of the lens frame relative to the eyewear platform can be changed. FIGS. 1–3 and 31–32 show the lens frame 10 mounted below the eyewear platform 15. Also, as shown in FIG. 4–6, this embodiment can have the lenses 20 mounted above the eyewear platform 15 with magnetic attachments.

Further, as described above, the contact surface of the magnets 100 and 60 can be at a different elevation than the contact surfaces of the temple and appendage sockets to form depressions. These depressions further provide resistance from the lenses from becoming involuntarily detached from the eyewear platform, especially from side-to-side or horizontal displacement.

Attaching Lenses to the Eyewear Platform with Magnets on the Lenses

In the embodiments with magnets 310 and 312 on the lens surface, to attach the lenses 20 to the eyewear platform 15, the magnets 310, 312 are oriented to couple, to mate, and to contact either the eyewear platform attachment surface 270 of the bridge portion 77 of the eyewear platform 15 or magnets 275 on said surface 270 such that the maximum magnetic attractive force is achieved along the horizontal axis 136 to provide an effective resistance from said lenses 20 from becoming involuntarily detached from said eyewear platform 15.

Embodiment with Magnets in the Platform Arm and the Appendage

In another embodiment of the invention as shown in FIG. 36–38, there is a connection device such as a magnet or a plug, which fits directly into the platform arm 80 of the eyewear platform 15. As shown in FIG. 36–38, there is a platform arm magnet 355, which lies and is directly integrated into the platform arm 80.

As in the embodiments described above, the eyewear platform 15 includes two temple extensions 40, which are capable of being placed over a user's ears, and a bridge portion 77, which is pivotally connected to each of the temple extensions 40, wherein the bridge portion 77 is capable of resting on a user's nose to permit the eyewear platform 15 to be worn by a user. The bridge portion 77 can also have nose pads 120.

The ends of the eyewear platform 15 have platform arms 80, which can curve and bend to mimic the appendages 35 on the lens frame 10 and to align with the temple extensions 40 such that the lens frame 10 will properly fit against the eyewear platform 15. Both the appendages and the platform arms 80 can provide a mounting or contact surface for the various attachment devices, such as magnets, clips, clasps, snap, hook, and straps for the invention.

FIG. 36–38 show the platform arm 80 having a platform arm magnet 355, which lies within and is surrounded by eyewear platform 15. The eyewear platform 15 also has a platform arm contact surface 360. The magnet 355 can lie flush with this contact surface 360. Also, the magnet 355 may lie above the contact surface 360, such that the first or contact surface 365 of the platform arm magnet 355 creates another elevation 370 on the platform arm 80. The magnet 355 may also lie below the platform arm contact surface 360 to create a platform arm depression 375, which is similar to the temple socket depression 115. This depression 375 can further help the eyewear platform 15 to securely attach to the lens frame 10 by providing greater horizontal or side-to-side displacement. Additionally, there can be multiple magnets in this depression 375. Further, the magnets 355 do not need to be completely surrounded by the eyewear platform 15.

Lens Frame

As shown in FIG. 36–38, the lens frame 10 has terminal lens frame ends 30, which each have an appendage 35. The appendages 35 as shown in FIG. 36 curve and bend to align with the temple extensions 40 of the eyewear platform 15. The appendages 35 further comprise an appendage contact surface 380.

The appendage further comprises at least one magnet 60a. This magnet 60a can be situated in a variety of different locations on the appendage; said magnet 60a has a magnet contact surface 65a. The magnet contact surface 65a can lie flush with, lie above, or below the appendage contact surface 380. Also, there can be multiple magnets in the appendage. Further, the magnets do not need to be surrounded by the appendage, but they can also be surrounded by the appendage.

Attachment of Lens Frame to Eyewear Platform

To attach the lens frame 10 to the eyewear platform 15, the platform arm magnet 355 is oriented to couple with the magnet 60a in the appendage 35. The platform arm magnet 355 engages and mates with the appendage socket magnet 60a to provide an effective resistance from said lens frame 10 from becoming involuntarily detached from said eyewear platform 15. In the embodiments described in FIG. 1–6, magnets are used to removably attach the lens frame 10 to the eyewear platform 15.

The magnets in the appendage 35 and the platform arm 80 need to be aligned along the same axis 135. By orienting both the platform arm magnet 355 and the appendage socket magnet 60 together along the same axis, the user can achieve an effective magnetic attractive force. Thus, as long as the platform arm magnet 355 is aligned and coupled with the appendage socket magnet 60a, then these magnets can be placed at virtually a myriad of angles and positions on the lens frame and the eyewear platform. As a result, the magnet axis 135 will change according to the mounting angle of the magnets.

Additionally, there are at least two magnets mated and paired with one another. In the alternative, this invention is not limited to having two magnets mated and paired with one another. This mounting of the lens frame to the eyewear platform can be accomplished with multiple magnets or only one magnet on either the lens frame or the eyewear platform. This single magnet can magnetically attach to a corresponding metallic surface.

In addition to the different angles of mounting the magnets on the appendage and platform arm magnets, the mounting of the lens frame relative to the eyewear platform can be changed: below the eyewear platform or above the eyewear platform. FIGS. 1–3 show the lens frame 10 mounted below the eyewear platform 15. FIG. 36–38 show the first or contact surface 365 of the platform arm magnet 355 making contact against the appendage magnet 60a so that said magnets 355 and 60a are oriented to provide effective resistance from said lens frame 10 from becoming involuntarily detached from said eyewear platform 15. In addition, the appendage magnet 60a can lie below the appendage contact surface 380 to create a depression 375, which can assist in creating greater resistance from horizontal or side-to-side displacement. Also, the appendage magnet 60a can lie above the appendage socket surface 380 and couple with the platform arm magnet 355, which can lie below the platform arm contact surface 360 and form a depression in the platform arm. This depression allows the appendage magnet 60a to sit and to provide a greater amount of resistance from side-to-side or horizontal resistance.

In addition, with this magnetic connection, the lens frame 10 can sit flush against the eyewear platform 15 to form a secure and effective connection and to avoid any space in between the lens frame 10 and the eyewear platform 15.

Snap Connection

As shown in the embodiments of FIG. 39–47, the lens frame 10 or lenses 20 can also be removably connected to the eyewear platform using snap connections 400. As shown in greater detail in FIG. 39, the snap connection 400 is comprised of two basic elements: (1) a ball or male portion 405 and (2) a socket or female portion 410. In FIGS. 39–40, the ball/male portion 405 is located on the appendage 35 of the lens frame 10; and the socket/female portion 410 is located on the platform arms 80 of the eyewear platform 15.

To connect the lens frame 10 or lenses 20 to the eyewear platform 15, the user simply aligns the ball/male portion 405 with the corresponding socket/female portion 410 on the eyewear platform and gently pushes or mates the male portion 405 with the female portion 410 so that the lenses 20 are or the lens frame 10 is securely attached to the eyewear platform 15 until the user wants to remove the two pieces. The male portion 405 should fit snugly into the space of the female portion 410. This snap connection 400 provides an effective resistance from said lens frame 10 from becoming involuntarily detached from said eyewear platform 15.

Depending on the particular frame, this snap connection 400 can be used in place of other attachment devices such as the magnets shown in FIGS. 1–7, 13–14 and 17–38. In addition, this snap connection 400 can be used with other connection devices, such as magnets (see FIGS. 1–24 and 26–39), clips (see FIG. 25), straps, clasps, or other connection devices to connect the lenses 20 or lens frame 10 to the eyewear platform 15.

In the alternative, the ball/male portion 405 can be located on the eyewear platform 15, and the socket/female portion 410 can be on the appendage of the lens frame 10 or lenses 20. The main advantage to having a male portion 405 on the appendage of the lens frame 10 or lenses 20 is that if the male portion 405 does break off or is broken, the user is still able to use the eyewear platform 15 with another set of lenses 20 or another lens frame 10 with properly working male portions 405. Because this invention allows the user to readily remove the lens frame 10 or lenses 20 from the eyewear platform 15, the user can also use different kinds of lenses with different colors, tints, coatings, and surfaces.

Please note that the male portion 405 is not limited to a ball or circular shape; what is important is the male portion 405 to be of a shape to allow the male portion 405 to securely connect with the female portion 410 such that the lens 20 or lens frame 10 is attached to the eyewear platform 15 until the user removes the lens 20 or lens frame 10. The male portion 405 clicks or squeezes to form a solid and secure contact with the female portion 410. Other possible shapes are oblongs. No matter the shape of the male portion 405, the male portion 405 should fit snugly into the space of the female portion 410, but this fit should still allow easy removal when the user pulls apart the lens frame 10 or lenses 20 from the eyewear platform 15.

Snap Connections on Sockets

In another embodiment, instead of using magnets 60, 100, as shown in FIG. 1–6, snap connections 400 can be used to attach the lens frame 10 to the eyewear platform 15. As shown in FIG. 41–42, the snap connections are located on the appendage socket 45 and the temple socket 85. The male portion 405 would be located on the appendage socket 45 to align with the female portion 410 on the temple socket 85. Please note that the male and female portions can be interchanged. Also, note that this snap connection 400 can be used when the lens frame 10 is mounted below the eyewear platform 15 as shown in FIG. 1–3 or above the eyewear platform 15 as shown in FIG. 4–6.

Snap Connections on Eyewear Platform and the Lens Frame

In another embodiment, instead of using magnets 275, 285 as shown in FIGS. 17 and 18, snap connections 400 can be used to attach the lens frame 10 to the eyewear platform 15. The male portions 405 would be located on the lens frame contact surface 280, and the corresponding female portions 410 would be located on the platform contact surface 270. As noted above, the locations of the male and female portions can be switched. In addition, there can be a multitude of snap connections that allow the lens frame 10 to be securely fastened to the eyewear platform 15. For example, FIG. 17 shows four magnetic attachments on the contact surfaces 270 and 280. Accordingly, multiple snap connections can be used to form a secure connection of the lens frame 10 to the eyewear platform 15.

In another embodiment, instead of using magnets as shown in FIG. 36, snap connections 400 can be used for attach the lens frame 10 to the eyewear platform 15. For example, the male portion 405 would be located on the appendage 35 to align and to connect with a corresponding female portion 410, which is located on the platform arms 80 of the eyewear platform 15. As with the other snap connections discussed above, the male and female portions can be switched.

Snap Connections on the Nose Bridge

Figure 43:
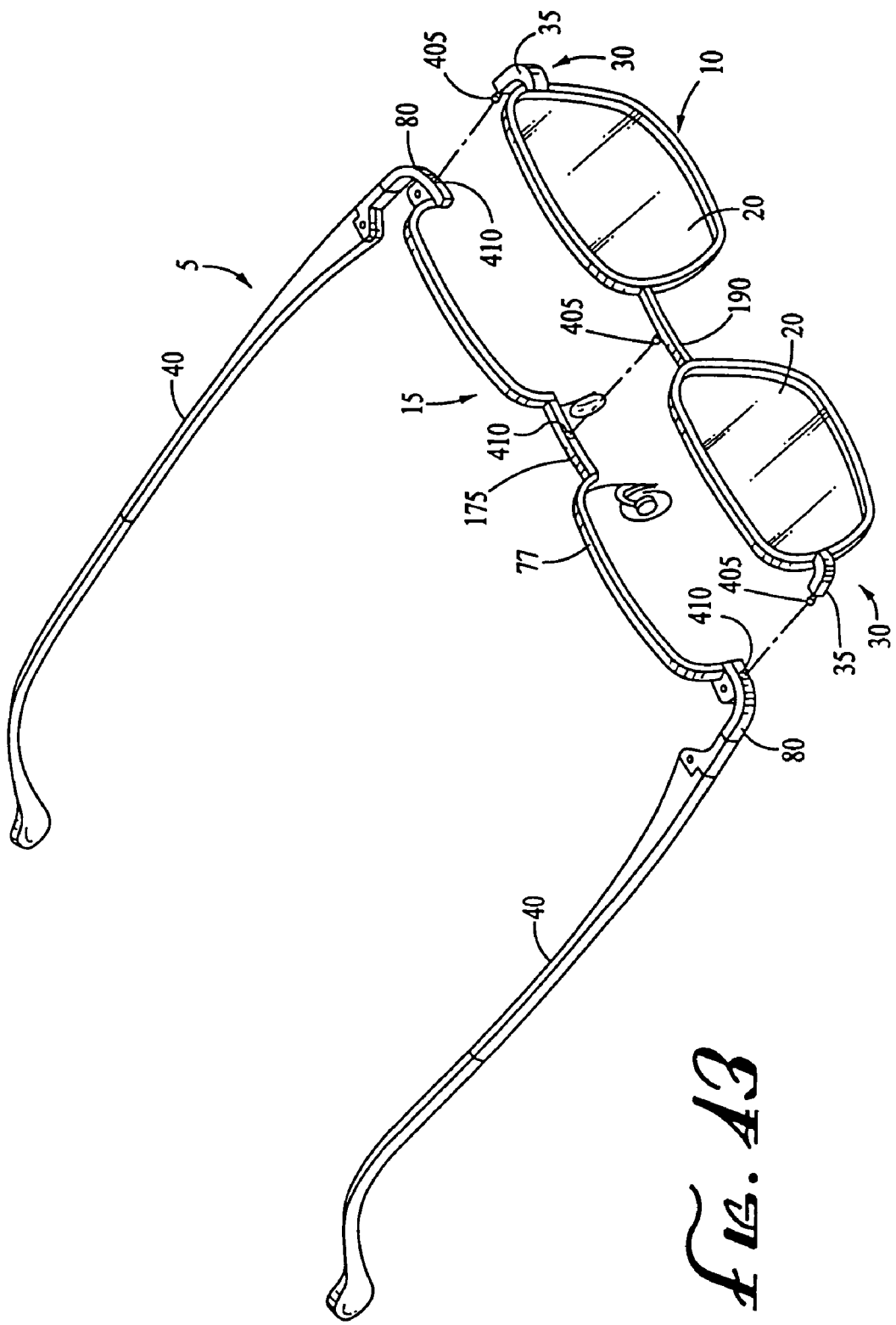
FIG. 43 is an exploded view of the embodiment of FIG. 40 with an additional snap connection at the nose bridge.

In another embodiment as shown in FIG. 43, a snap connection 400 can be located at the nose bridge 175. The male portion 405 would be on the lens connector 190 and the corresponding female portion 410 on the center or midpoint of the bridge portion 77 of the eyewear platform 15. As with the other snap connections discussed above, the male and female portions can be switched. The snap connection 400 of the nose bridge 175 is near the center or the midpoint of the bridge portion 77 of the eyewear platform 15.

This snap connection 400 on the nose bridge 175 can be used by itself, but it can also be used in conjunction with snap connections 400 at the ends 30 of the lens frame and the ends of the eyewear platform 15 as shown in FIG. 39–40 or with other connection devices such as magnets, clips, or prongs. Additionally, there can be multiple snap connections 400 at or near the nose bridge 175.

Snap Connections with the Removable Lenses

In another embodiment, instead of using magnets 60, 100 as shown in FIG. 31–35, snap connections 400 can be used to attach the lens frame 10 to the eyewear platform 15. The male portions 405 would be located on the appendages 35 and would be aligned to mate and to securely attach to the female portions 410, which would be located on temple sockets 45. This snap connection is further shown in FIGS. 41–42. As noted above, the locations of the male and female portions can be switched.

Figure 44:
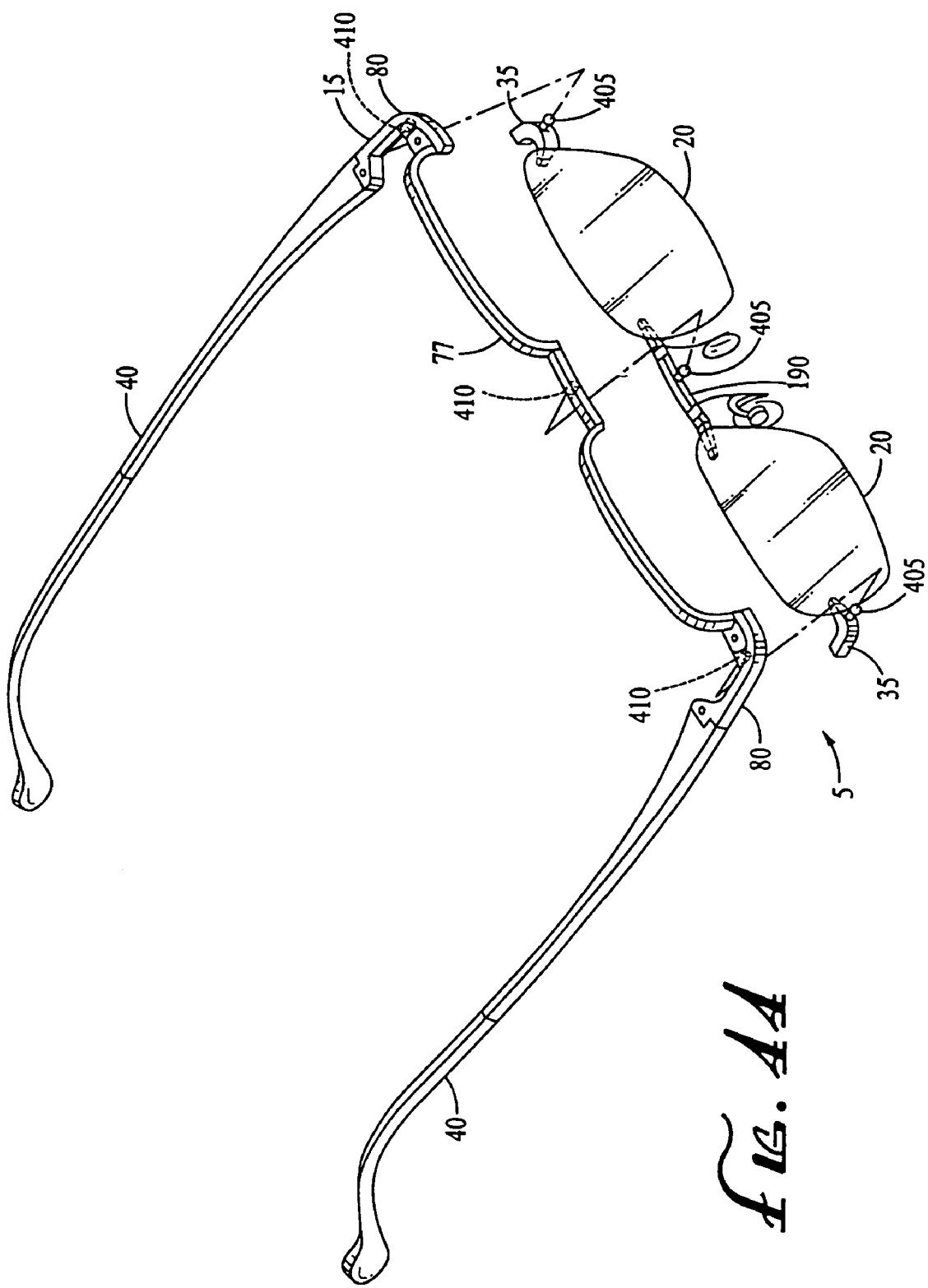
FIG. 44 is an exploded view of another embodiment of the snap connection wherein the lenses sit and connect behind the bridge portion of the eyewear platform.

In another embodiment, the snap connections can be used to attach the lenses 20 to the eyewear platform 15. As shown in FIG. 44, the male portion(s) 405 would be placed on the appendages 35 of the lenses to align with female portions 410 on inside or second surface 79 of the bridge portion 77 of the eyewear platform 15. The bridge portion 77 having a first or outer surface 78 and a second or an inner surface 79. In addition, there also can be snap connections 400 on the lens connection 190, which would align and securely mate and connect with the second surface 79 of the bridge portion 77.

Snap Connections or Magnets on the Platform Arm Terminal End

Figure 45:
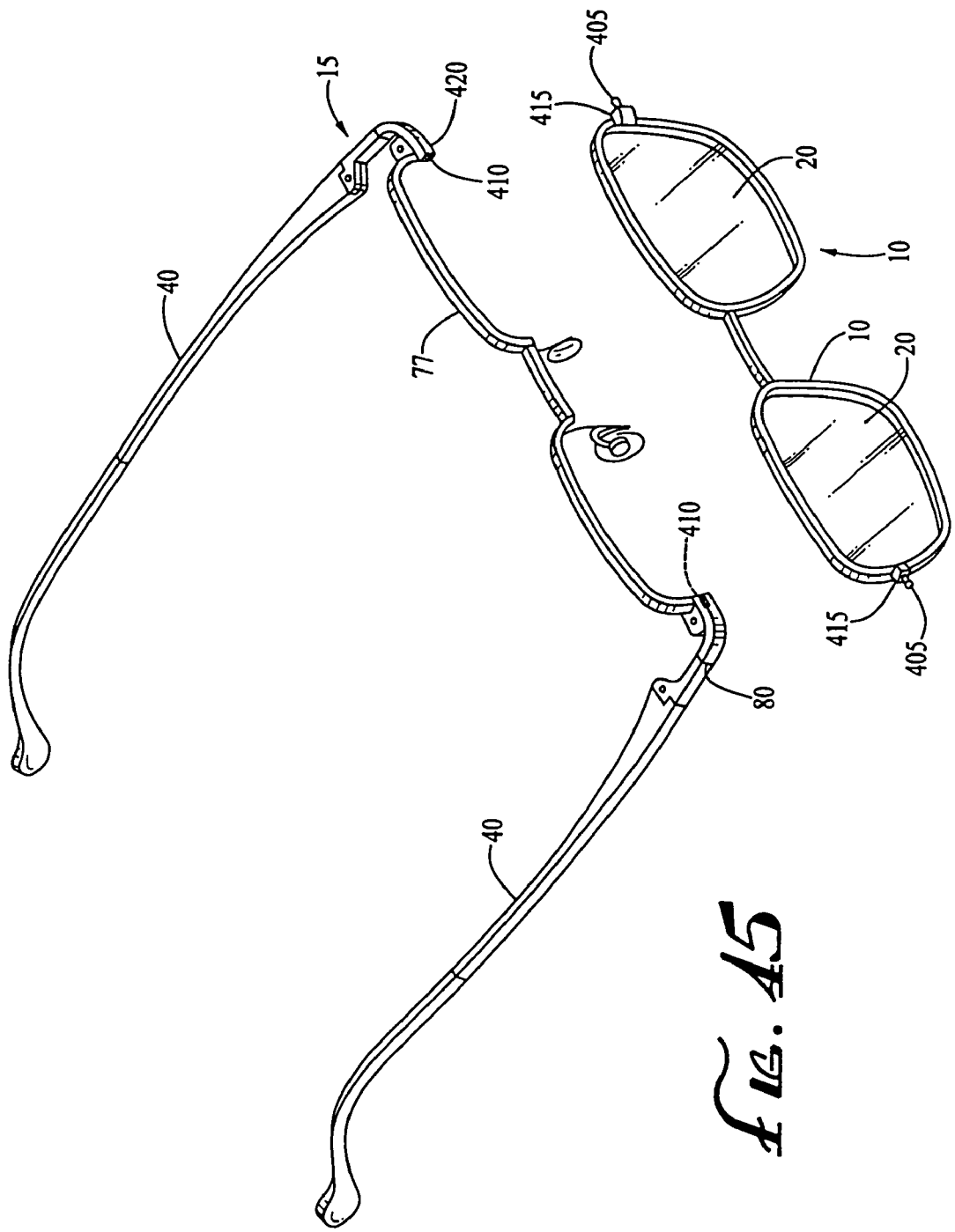
FIG. 45 is an exploded view of another embodiment of the snap connection wherein the male portion is placed on the appendage terminal end and the female portion is placed on the platform arm terminal end.

As shown in FIG. 45, there is another embodiment of the snap attachment 400. The male portion 405 is located on the appendage terminal end 415 of the lens frame 10. This male portion 405 can also be directly attached to the lens frame 10 and without an appendage 35. The female portion 410 is located at the platform arm terminal end 420. To connect the lens frame 10 to the eyewear platform 15, the user aligns the male portion 405 with the corresponding female portion 410 and snaps the male portion 405 into the female portion 410 to form a secure connection, which provides an effective resistance for the lens frame from being involuntarily detached from the eyewear platform. Because the lens frame 10 and/or the eyewear platform 15 allow for a sufficient degree of flexibility, the user is able to easily fit the lens frame 10 within the eyewear platform 15 to form a snug and effective fit.

As with the other embodiments discussed above, the male and female portions can be interchanged so that the male portion 405 can be placed on the platform arm terminal end 420 and the corresponding female portion 410 can be placed on the appendage terminal end 420. Also, this particular snap connection 400 as shown in FIG. 45 can also be used in embodiments with lenses 20, as shown in FIGS. 31 and 33.

In addition, instead of using this snap connection 400 as shown in FIG. 45, this invention also allows for attachment of the lens frame 10 or lenses 20 to the eyewear platform 15 with magnets. Magnets can be placed on either or both of the platform terminal end 420 and the corresponding part of the appendage terminal end 415.

Snap Connections or Magnets on the Inner Side of the Platform Arm

Figure 46:
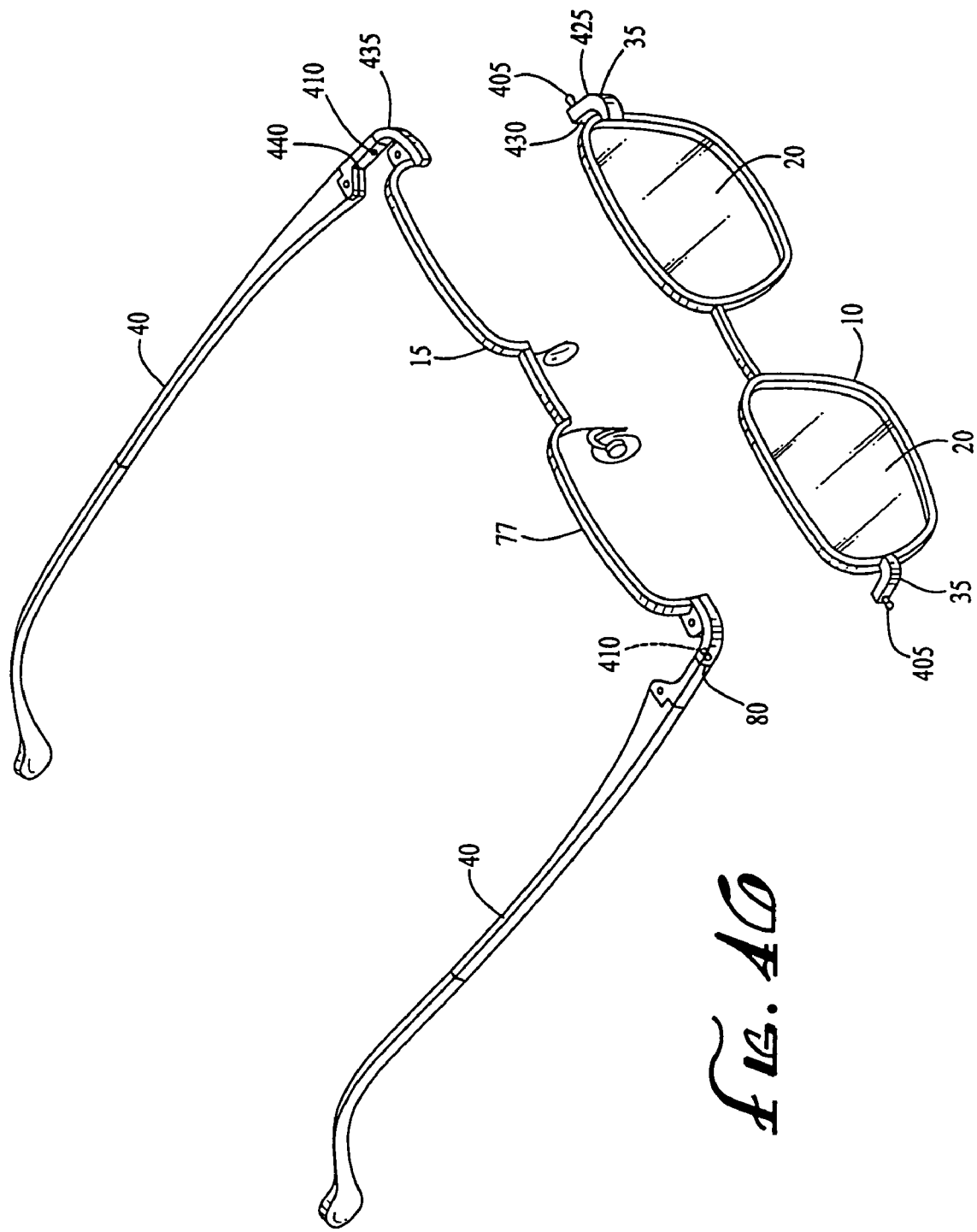
FIG. 46 is an exploded view of another embodiment of the snap connection wherein the male portion is placed on the outer part of the appendage and the female portion is placed on the inner part of the platform arm.

As shown in FIG. 46, there is shown another embodiment of the snap attachment 400. The male portion 405 is located on the appendage outer surface 425 of the lens frame 10. The female portion 410 is located at the platform arm inner surface 440. In FIG. 46, the appendage 35 fits over the corresponding platform arm 80. However, in another embodiment, the appendage 35 can fit under the corresponding platform arm 80. To connect the lens frame 10 to the eyewear platform 15, the user aligns the male portion 405 with the corresponding female portion 410 and snaps the male portion 405 into the female portion 410 to form a secure connection, which provides an effective resistance for the lens frame from being involuntarily detached from the eyewear platform. Because the lens frame 10 and/or the eyewear platform 15 allow for a sufficient degree of flexibility, the user is able to easily fit the lens frame 10 with the eyewear platform 15 to form a snug and effective fit.

As with the other embodiments discussed above, the male and female portions can be interchanged so that the male portion 405 can be placed on the platform arm inner surface 440 and the corresponding female portion 410 can be placed on the appendage outer surface 425. Also, this snap connection 400 as shown in FIG. 46 can also be used in embodiments with lenses 20, which are connected with a lens connector 190, as shown in FIGS. 31 and 33.

In addition, instead of using this snap connection 400 as shown in FIG. 46, this invention also allows for attachment of the lens frame 10 or lenses 20 to the eyewear platform 15 with magnets. Magnets can be placed on either or both of the platform inner surface 440 and the corresponding part of the appendage outer surface 425.

Figure 47:
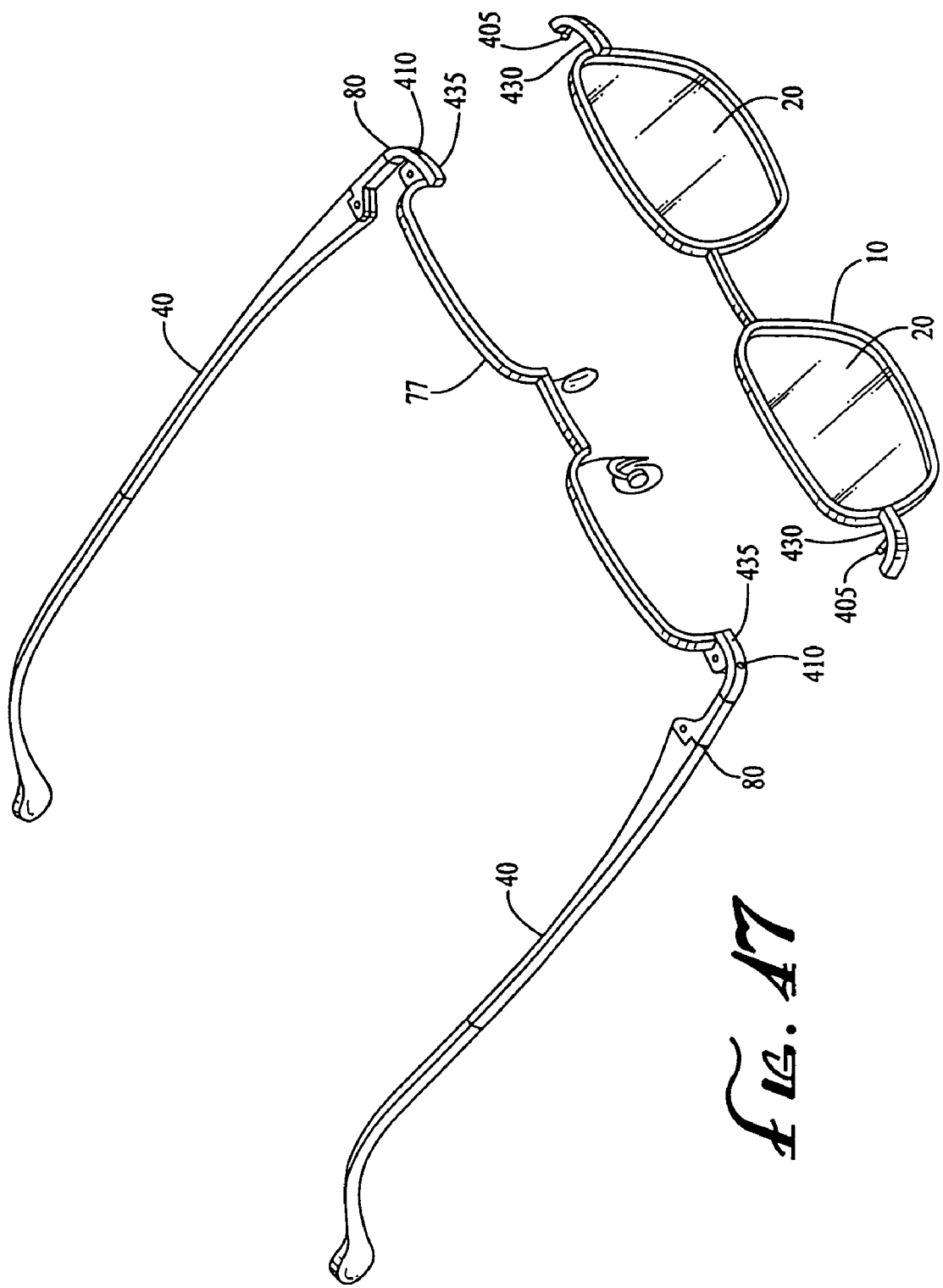
FIG. 47 is an exploded view of another embodiment of the snap connection wherein the male portion is on the appendage inner surface and the female portion is on the platform arm outer surface.

As shown in FIG. 47, the male portion 405 can be placed on the appendage inner surface 430 and the corresponding female portion 410 can be placed on the platform outer surface 435. To connect the lens frame 10 to the eyewear platform 15, the user aligns the male portion 405 with the corresponding female portion 410 and snaps the male portion 405 into the female portion 410 to form a secure connection, which provides an effective resistance for the lens frame from being involuntarily detached from the eyewear platform. Because the lens frame 10 and/or the eyewear platform 15 allow for a sufficient degree of flexibility, the user is able to easily fit the lens frame 10 with the eyewear platform 15 to form a snug and effective fit. Also, depending on the particular design, this snap connection or magnet connection can allow for the lens frame 10 or lenses 20 to mimic the shape of the bridge portion 77 of the eyewear platform 15.

As with the other embodiments discussed above, the male and female portions can be interchanged so that the male portion 405 can be placed on the platform arm outer surface 435 and the corresponding female portion 410 can be placed on the appendage inner surface 430. Also, this snap connection 400 can also be used in embodiments with lenses 20, which are connected with a lens connector 190, as shown in FIGS. 31 and 33.

In addition, instead of using this snap connection 400 as shown in FIG. 47, this invention also allows for attachment of the lens frame 10 or lenses 20 to the eyewear platform 15 with magnets. Magnets can be placed on either or both of the platform outer surface 435 and the corresponding part of the appendage inner surface 430.

While the invention as described in connection with its preferred embodiments, it will be understood that it is not intended to limit the invention to those embodiments. On the contrary, it is intended to cover all alternatives, modifications, and equivalents as may be included within the spirit and scope of the invention as defined by the appended claims.

I claim:

1. Eyeglasses comprising:
    an eyewear platform and at least one lens,
    said eyewear platform having two temple extensions capable of being placed over a user's ears and a bridge portion pivotally connected to each of said temple extensions;
    said eyewear platform containing a first set of connections located in proximity to said temple extensions;
    said bridge portion being capable of resting on a user's nose to permit said eyewear platform to be worn by a user;
    said at least one lens capable of providing shade for at least one eye;
    said at least one lens containing a second set of connections, said second set of connections being located so as to be capable of engaging said first set of connections for holding said at least one lens onto said eyewear platform; and,
    said at least one lens capable of being removably secured to said eyewear platform.

2. The eyeglasses of claim 1, wherein said first set of connections comprises at least one metallic member connected to said eyewear platform and said second set of connections comprises at least one magnetic member connected to said lens, said metallic member and said magnetic member capable of attaching to each other.

3. The eyeglasses of claim 1, wherein said second set of connections comprises at least one metallic member connected to said lens and said first set of connections comprises at least one magnetic member connected to said eyewear platform, said metallic member and said magnetic member capable of attaching to each other.

4. The eyeglasses of claim 1, wherein said eyewear platform includes a platform contact surface and said at least one lens includes a lens contact surface wherein said platform and said lens contact surfaces are capable of coupling with each other.

5. The eyeglasses of claim 1, wherein said eyewear platform further comprises at least one nose pad located near a midpoint of said eyewear platform.

6. Eyeglasses comprising:
    an eyewear platform and at least one lens,
    said eyewear platform having two temple extensions capable of being placed over a users ears and a bridge portion pivotally connected to each of said temple extensions;
    said eyewear platform containing at least one first connection located in proximity to one said temple extension;
    said first connection having a first member therein;
    said bridge portion being capable of resting on a user's nose to permit said eyewear platform to be worn by a user;
    said at least one lens capable of providing shade for at least one eye;
    said at least one lens containing at least one second connection, said second connection having a second member therein and being located so as to be capable of engaging said first connection for holding said at least one lens onto said eyewear platform; and,
    wherein said second member is magnetically attachable to said first member such that at least one lens is capable of being removably secured to said eyewear platform.

* * * * *